United States Patent
Min et al.

(10) Patent No.: US 11,943,639 B2
(45) Date of Patent: Mar. 26, 2024

(54) ELECTRONIC DEVICE PERFORMING RESCHEDULING OVER WIRELESS CHANNEL AND METHOD FOR CONTROLLING SAME

(71) Applicant: Samsung Electronics Co., Ltd., Suwon-si (KR)

(72) Inventors: Hyunkee Min, Suwon-si (KR); Hyeonu Choi, Suwon-si (KR); Jeongyong Myoung, Suwon-si (KR); Junyoung Park, Suwon-si (KR); Changmok Yang, Suwon-si (KR); Sunkey Lee, Suwon-si (KR); Junghun Lee, Suwon-si (KR); Junsu Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 242 days.

(21) Appl. No.: 17/474,399

(22) Filed: Sep. 14, 2021

(65) Prior Publication Data

US 2022/0141680 A1 May 5, 2022

Related U.S. Application Data

(63) Continuation of application No. PCT/KR2021/011574, filed on Aug. 30, 2021.

(30) Foreign Application Priority Data

Oct. 30, 2020 (KR) .................. 10-2020-0143790

(51) Int. Cl.
*H04W 24/02* (2009.01)
*H04L 43/0852* (2022.01)
(Continued)

(52) U.S. Cl.
CPC ......... *H04W 24/02* (2013.01); *H04L 43/0858* (2013.01); *H04L 43/16* (2013.01); *H04W 24/08* (2013.01); *H04W 76/28* (2018.02)

(58) Field of Classification Search
CPC ..... H04W 24/02; H04W 24/08; H04W 76/28; H04W 28/02; H04W 28/04; H04W 72/12;
(Continued)

(56) References Cited

U.S. PATENT DOCUMENTS 11,523,306 B1 * 12/2022 Chu .................. H04L 69/324
2015/0312074 A1   10/2015 Zhu et al.
(Continued)

FOREIGN PATENT DOCUMENTS

EP    3493603 A1     6/2019
JP    2018-186342 A  11/2018
(Continued)

OTHER PUBLICATIONS

International Search Report and Written Opinion of the International Searching Authority dated Nov. 23, 2021, in connection with International Application No. PCT/KR2021/011574, 10 pages.
(Continued)

*Primary Examiner* — Kwang B Yao
*Assistant Examiner* — Syed M Bokhari

(57) ABSTRACT

According to various embodiments, an electronic device may include a communication circuit operably coupled with an external electronic device and at least one processor, wherein the at least one processor may be configured to determine one or more target-wake-time (TWT) parameters of at least one TWT service period based on at least one of the amount of data transmitted to the external electronic device, an amount of data received from the external electronic device, or a bandwidth, wherein at least one data frame is transmitted or received between the electronic
(Continued)

device and the external electronic device during the at least one TWT service period; identify quality of service (QoS) for the at least one data frame transmitted or received during the at least one TWT service period; change at least one TWT parameter among the one or more TWT parameters based on the identified QoS; and control the communication circuit to transmit or receive at least one next data frame during the a next TWT service period based on the changed at least one TWT parameter.

13 Claims, 23 Drawing Sheets

(51) Int. Cl.
  *H04L 43/16* (2022.01)
  *H04W 24/08* (2009.01)
  *H04W 76/28* (2018.01)

(58) Field of Classification Search
  CPC . H04W 84/12; H04W 28/24; H04W 52/0216; H04W 28/0236; H04W 72/0446; H04W 72/1263; H04W 72/542; H04L 24/0858; H04L 43/16; H04L 43/0852; Y02D 30/70
  USPC ........................................................ 370/252
  See application file for complete search history.

(56) References Cited

U.S. PATENT DOCUMENTS

| | | |
|---|---|---|
| 2016/0219522 A1 | 7/2016 | Asterjadhi et al. |
| 2017/0155484 A1 | 6/2017 | Kang et al. |
| 2018/0295573 A1 | 10/2018 | Gidvani et al. |
| 2018/0310245 A1 | 10/2018 | Ouchi |
| 2018/0332534 A1 | 11/2018 | Hou et al. |
| 2019/0045438 A1* | 2/2019 | Cariou .............. H04W 52/0229 |
| 2019/0075521 A1 | 3/2019 | Kneckt et al. |
| 2019/0102717 A1 | 4/2019 | Wu et al. |
| 2019/0253965 A1 | 8/2019 | Gan et al. |
| 2019/0274147 A1 | 9/2019 | Yang et al. |
| 2019/0306790 A1* | 10/2019 | Kottontavida ........ H04W 72/52 |
| 2020/0045634 A1* | 2/2020 | Kneckt ............... H04W 40/244 |
| 2020/0084102 A1 | 3/2020 | Choi et al. |
| 2020/0221381 A1* | 7/2020 | Homchaudhuri ........................... H04W 52/0235 |
| 2020/0267644 A1 | 8/2020 | Rajib et al. |
| 2020/0359327 A1* | 11/2020 | Bhanage .......... H04W 52/0235 |
| 2020/0389870 A1 | 12/2020 | Shin et al. |
| 2021/0058862 A1 | 2/2021 | Choo et al. |
| 2022/0078079 A1 | 3/2022 | Choi et al. |

FOREIGN PATENT DOCUMENTS

| | | |
|---|---|---|
| KR | 10-2016-0124223 A | 10/2016 |
| KR | 10-2017-0021306 A | 2/2017 |
| KR | 10-2019-0107600 A | 9/2019 |
| KR | 10-2020-0028208 A | 3/2020 |
| WO | 2017164687 A1 | 9/2017 |
| WO | 2017188548 A1 | 11/2017 |

OTHER PUBLICATIONS

Supplementary European Search Report dated Nov. 9, 2023, in connection with European Patent Application No. 21886522.8, 9 pages.

* cited by examiner

ELECTRONIC DEVICE PERFORMING RESCHEDULING OVER WIRELESS CHANNEL AND METHOD FOR CONTROLLING SAME

CROSS REFERENCE TO RELATED APPLICATIONS

This application is continuation of International Application No. PCT/KR2021/011574, filed Aug. 30, 2021, which claims priority to Korean Application No. 10-2020-0143790, filed Oct. 30, 2020, which applications are incorporated herein by reference.

BACKGROUND

1. Field of the Disclosure

Various embodiments of the disclosure relate to an electronic device for performing rescheduling over a wireless channel on the basis of a wireless channel environment, and a method for controlling the same.

2. Description of the Related Art

Various services and additional functions provided through electronic devices, for example, portable electronic devices such as smart phones, are gradually increasing. In order to increase the effective value of the electronic devices and meet the various needs of users, communication service providers or electronic device manufacturers are competitively developing electronic devices to provide various functions and differentiate the same from those of other companies. Accordingly, various functions provided through the electronic device are also being gradually advanced.

Augmented reality (AR) is a technology that superimposes a three-dimensional (or two-dimensional) virtual image over a real image or background to display a single image. Augmented reality technology, in which the real environment and virtual objects are mixed, allows users to see the real environment, thereby providing better realism and additional information.

The electronic device may communicate with an external electronic device and/or a server. For example, the electronic device may transmit and/or receive data to and/or from an external electronic device and/or a server through a local area network and/or a remote area network. For example, the external electronic device may include AR glasses that provide an augmented reality service. The electronic device may receive a variety of sensing data and/or image data from the external electronic device, generate augmented reality image data (AR image data) based on the received data (e.g., perform rendering), and transmit the same to the external electronic device, thereby providing an augmented reality image to the user through the external electronic device. The electronic device may receive a variety of information from the server and generate augmented reality image data using both the data received from the external electronic device and the variety of information received from the server.

A system that provides augmented reality may require low power consumption and/or low latency in order to provide an effective augmented reality experience (AR experience) to the user.

For example, in order to reduce the weight and/or volume of the external electronic device (e.g., AR glasses), the battery capacity of the external electronic device may be limited. Therefore, it is necessary to minimize the current consumption of the external electronic device for providing augmented reality images. An example of a method of reducing the current consumption of the external electronic device may be one in which devices for wireless communication of the external electronic device operate in a wake-up state during a period of transmitting and/or receiving data and switch to a sleep state (e.g., a doze mode) within the remaining periods through wireless scheduling for the external electronic device. However, limitation on the time for transmitting and/or receiving data described above may cause loss of some packets due to interference, collisions, and/or congestion in the wireless environment, or failure of transmission of full data for generating augmented reality image data and/or reproducing an augmented reality image within a given wake-up period.

For example, high latency occurring when an augmented reality image is reproduced in the external electronic device may provide a poor augmented reality experience to the user. Therefore, in order to provide an augmented reality image, it is necessary to minimize latency in transmission and/or reception of data, and/or end-to-end latency of the electronic device and/or the external electronic device. If the entire data for generating augmented reality image data and/or reproducing an augmented reality image fails to be transmitted within a given wake-up period in the case where the time for transmitting and/or receiving data is limited according to the above-described example of a method of reducing the current consumption of the external electronic device, the aforementioned end-to-end latency may occur. For example, if the data that fails to be transmitted within a given wake-up period is retransmitted in the next wake-up period, latency in the process of transmitting and/or receiving data and/or the end-to-end latency of the electronic device and/or the external electronic device may increase.

According to various embodiments, there may be provided an electronic device and/or an external electronic device that perform retransmission of at least a portion of data within a given wake-up period in the case where at least a portion of data is lost or fails to be transmitted in the state in which the time for transmitting and/or receiving data is limited due to wireless scheduling.

According to various embodiments, there may be provided an electronic device and/or an external electronic device that rearrange a wireless schedule for retransmission of at least a portion of data in the case where at least a portion of data is lost or fails to be transmitted in the state in which the time for transmitting and/or receiving data is limited due to wireless scheduling.

According to various embodiments, there may be provided an electronic device and/or an external electronic device that identify the end-to-end latency of the electronic device and/or the external electronic device and change at least one parameter for a wireless schedule in the state in which the time for transmitting and/or receiving data is limited due to wireless scheduling.

SUMMARY

According to various embodiments, an electronic device may include a communication circuit operably coupled with an external electronic device and at least one processor, wherein the at least one processor may be configured to: determine one or more target-wake-time (TWT) parameters of at least one TWT service period based on at least one of the amount of data transmitted to the external electronic device, an amount of data received from the external electronic device, or a bandwidth, wherein at least one data frame is transmitted or received between the electronic device and the external electronic device during the at least one TWT service period; identify a quality of service (QoS) for the at least one data frame transmitted or received during the at least one TWT service period; change at least one TWT parameter among the one or more TWT parameters based on the identified QoS; and control the communication circuit to transmit or receive at least one next data frame during the next TWT service period based on the changed at least one TWT parameter.

According to various embodiments, a method for controlling an electronic device may include: determining one or more TWT parameters of at least one TWT service period based on at least one of the amount of data transmitted to an external electronic device connected to the electronic device, an amount of data received from the external electronic device connected to the electronic device, or a bandwidth, wherein at least one data frame is transmitted or received between the electronic device and the external electronic device during the at least one TWT service period; identifying a quality of service (QoS) for the at least one data frame transmitted or received during the at least one TWT service period; changing at least one TWT parameter among the one or more TWT parameters based on the identified QoS; and transmitting or receiving at least one next data frame during the next TWT service period based on the changed at least one TWT parameter.

According to various embodiments, an electronic device may include a communication circuit and at least one processor, wherein the at least one processor may be configured to: determine one or more periods for transmitting or receiving data frames between the electronic device and an external electronic device based on at least one of the amount of data transmitted to and received from an external electronic device, which is operably connected through the communication circuit, or a bandwidth; identify whether a missing frame exists among one or more data frames transmitted or received during a first period of the determined one or more periods; and, in response to identifying that the missing frame exists, control the communication circuit to transmit or receive the missing frame to or from the external electronic device during a second period, which is different from the determined periods, and wherein the second period may be determined to be a period prior to a starting time of the next period of the first period, among the one or more determined periods, based on information transmitted during the first period.

According to various embodiments, the electronic device and/or the external electronic device is able to retransmit the data that failed to be transmitted within a given wake-up period, thereby preventing an increase in latency due to data retransmission.

According to various embodiments, the electronic device and/or the external electronic device is able to prevent an increase in latency due to data retransmission by rearranging a wireless schedule.

According to various embodiments, the electronic device and/or the external electronic device is able to minimize loss of data when transmitting and/or receiving data by changing at least one parameter for a wireless schedule.

The various effects conveyed by the disclosure are not limited to the above-described effects.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
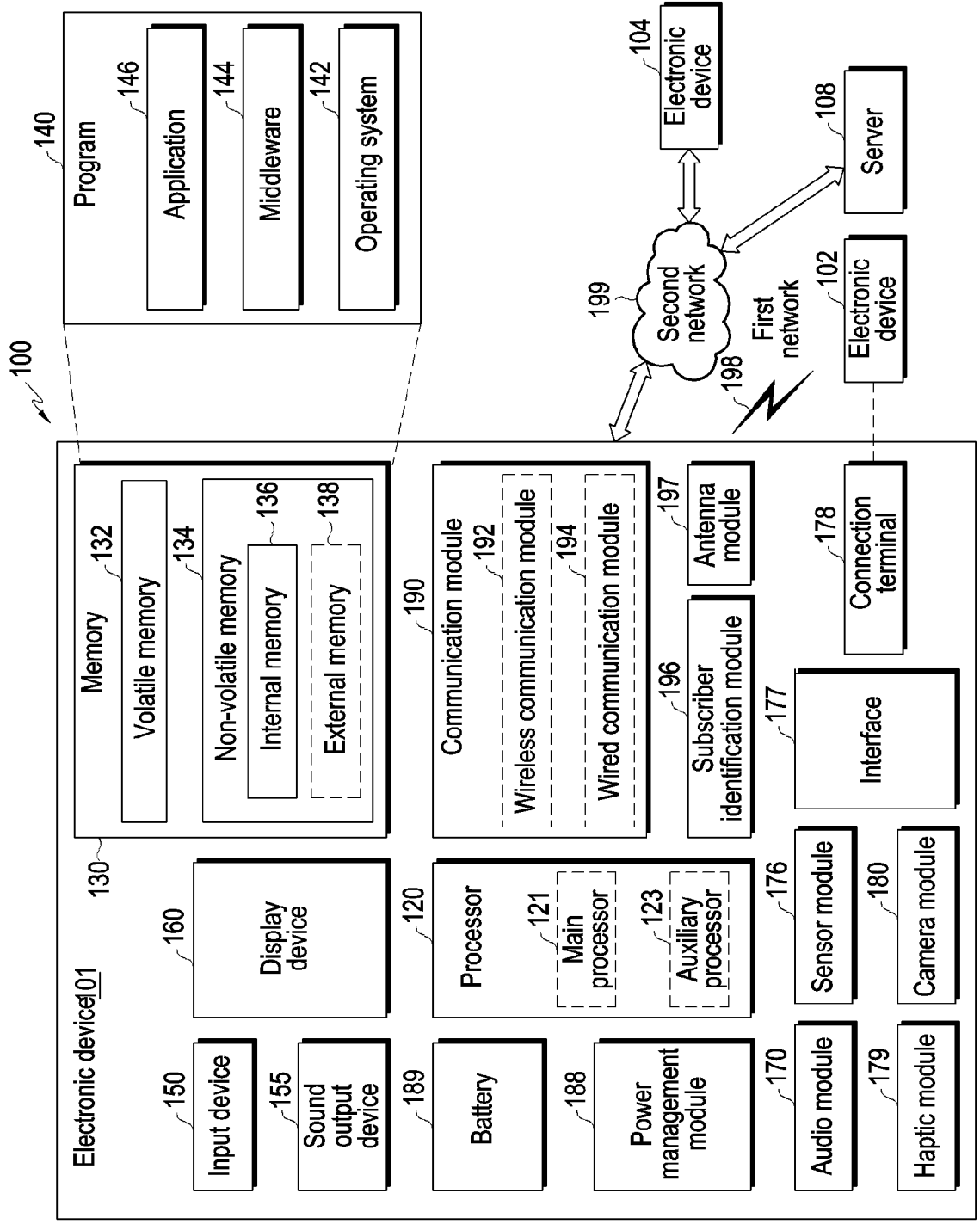
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
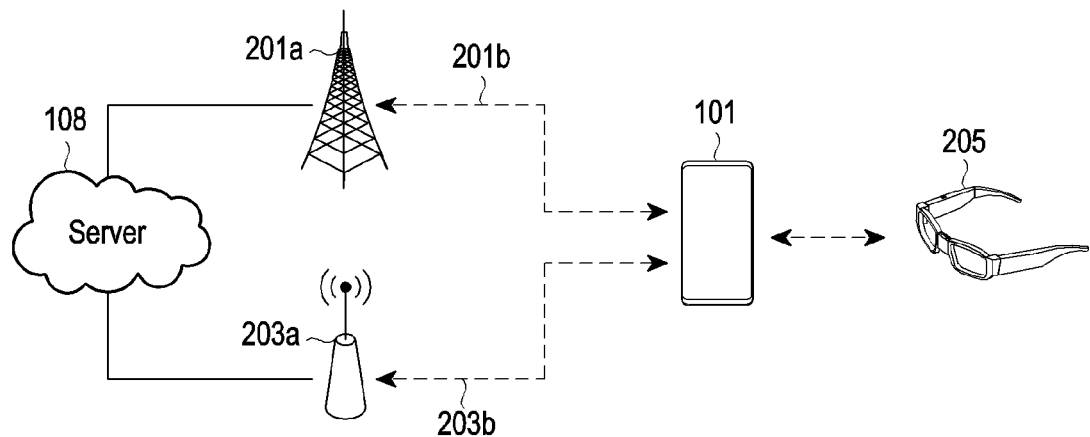
FIG. 2 is a diagram illustrating an example of a system for providing augmented reality according to various embodiments.

FIG. 2 is a diagram illustrating an example of a system for providing augmented reality according to various embodiments.

Referring to FIG. 2, a system for providing augmented reality may include an electronic device 101, an external electronic device 205 (e.g., the electronic devices 102 and 104 in FIG. 1), and/or a server 108. For example, the electronic device 101 may be a portable terminal such as a smart phone. For example, the external electronic device 205 may include an AR device for providing an augmented reality image, such as AR glasses. For example, the server 108 may include a cloud server.

According to various embodiments, the electronic device 101 may transmit and/or receive data to and/or from the external electronic device 205 through a first network (e.g., the first network 198 in FIG. 1) and/or a second network (e.g., the second network 199 in FIG. 1). For example, the electronic device 101 may receive sensing data and/or image data from the external electronic device 205. For example, transmission and/or reception of data between the electronic device 101 and the external electronic device 205 may be performed through a Bluetooth communication scheme or a WiFi direct communication scheme. For example, transmission and/or reception of data between the electronic device 101 and the external electronic device 205 may be performed through a WiFi communication scheme through an access point (AP). When the electronic device 101 and the external electronic device 205 are connected through the WiFi direct communication scheme or the WiFi communication scheme, a wireless communication protocol defined in the IEEE 802.11 wireless local area network (WLAN) standard may be used. In addition to the above-described examples, the electronic device 101 may be connected to the external electronic device 205 through the second network 199 such as a cellular communication scheme.

According to various embodiments, the electronic device 101 may transmit and/or receive data to and/or from the server 108 through a first network (e.g., the first network 198 and/or the second network 199 in FIG. 1). For example, the electronic device 101 may receive, from the server 108, a variety of information that may be used to generate augmented reality image data. For example, transmission and/or reception of data between the electronic device 101 and the server 108 may be performed through a connection 201b via a cellular communication scheme using a base station 201a and/or a connection 203b through a WiFi communication scheme using an access point (AP) 203a.

In the disclosure, the case where the electronic device 101 or the external electronic device 205 performs a specific operation may indicate, for example, that a processor included in the electronic device 101 or the external electronic device 205 performs a specific operation or controls other hardware (e.g., the wireless communication module 192) to perform a specific operation. Alternatively, the case where the electronic device 101 or the external electronic device 205 performs a specific operation may indicate, for example, that a processor performs a specific operation or controls another hardware (e.g., the wireless communication module 192) to perform a specific operation as at least one command stored in a memory included in the electronic device 101 or the external electronic device 205 is executed.

Figure 3:
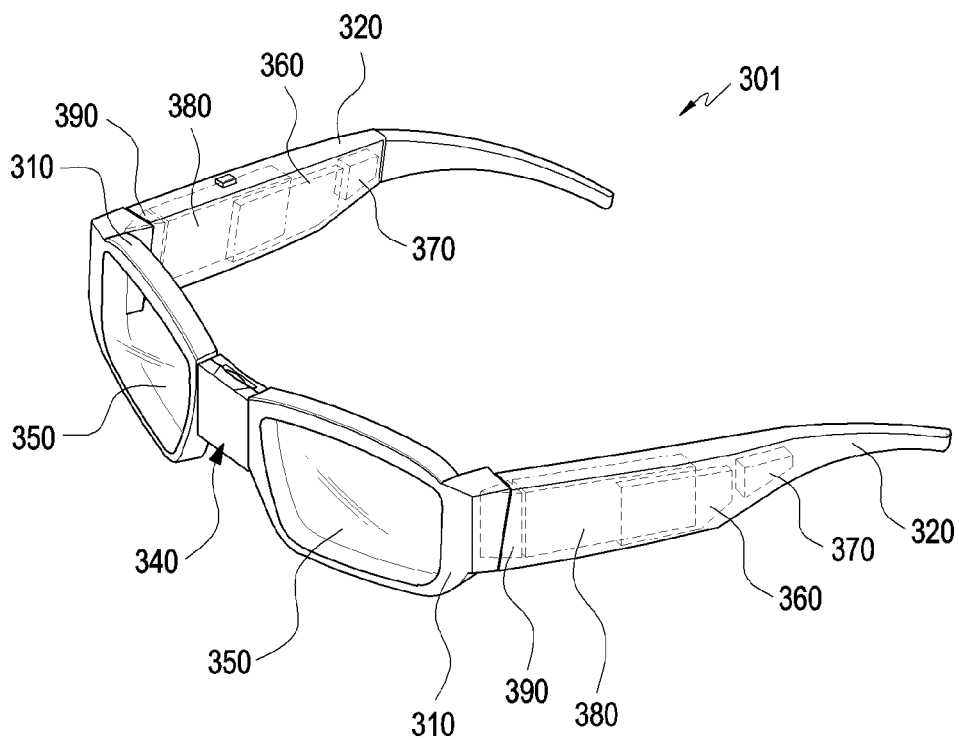
FIG. 3 illustrates an example of an external electronic device according to various embodiments.

FIG. 3 illustrates an example of an external electronic device 205 according to various embodiments.

Referring to FIG. 3, according to various embodiments, the external electronic device 205 may be AR glasses 301.

According to various embodiments, the AR glasses 301 may include a pair of display devices 350 and a pair of housings 310. The pair of display devices 350 may be respectively fixed to the pair of housings 310 in the form of a frame. A pair of wearing members 320 may extend parallel to each other from the pair of housings 310. The AR glasses 301 may be a head-mounted electronic device. Although the AR glasses 301 is illustrated as a head-mounted wearable electronic device, this is only an example, and it can be easily understood by those skilled in the art that there is no limitation on the form of implementation of the AR glasses 301.

According to various embodiments, the AR glasses 301 may include a spacing adjustment structure 340 for adjusting the length between the pair of housings 310, and a circuit board 360 and a battery 370 disposed in the wearing member 320. As another example, a light output device 380 (e.g., a projector), a light refraction module 390 (e.g., a prism), or a display module (not shown) may be included in the wearing member 320 of the electronic device 101.

According to various embodiments, the display device 350 may include a display module, a projector, a sensor equipped with a touch circuit, and the like, and a display of the display module may be a transparent or translucent display. As another example, the display device 350 may include a window member (e.g., a transparent member), and the window member may include a light control member disposed on at least a portion of the window member. The light control member may be translucent glass or a member capable of adjusting the transmittance of light as the color concentration is adjusted. As another example, the display device 350 may include a lens including a waveguide, a reflective lens, and the like, and each lens may transmit light output from the output device to the user's eye.

According to various embodiments, the pair of housings 310 may be in the form of a frame that at least partially surrounds the edges of each of the display devices 350, and may serve as a rim in the structure of glasses including general sunglasses.

According to various embodiments, the circuit boards 360 may be disposed in the respective wearing members 320, and circuit lines connecting the circuit boards may be disposed inside or outside the pair of housings 310. The pair of wearing members 320 may serve as a temple in the general structure of glasses. For example, the pair of housings 310 may be positioned on the user's face such that the display devices 350 correspond to the user's eyes, and the pair of wearing members 320 may be worn on the user's respective ears on both sides of the user's head.

According to various embodiments, the pair of wearing members 320 may be utilized to dispose the circuit board 360, the battery 370, the light output device 380, the light refraction module 390, and the like. For example, each of the pair of wearing members 320 may have a housing structure capable of accommodating the circuit board 360, the battery 370, the light output device 380 or the light refraction module 390. As another example, the electronic device 101 may have the circuit board 360, the battery 370, the light output device 380, and the light refraction module 390 in the pair of wearing members 320, respectively. As another example, the circuit board 360, the battery 370, the light output device 380, or the light refraction module 390 may be variously disposed in consideration of the weight distribution and comfort of wearing of the electronic device 101.

According to an embodiment, a plurality of circuit boards 360 may be configured, one of which may be provided as a board including a driving circuit of the display device 350, a processor for processing image information and the like, and a communication module for performing communication with the electronic device 101. The processor may output an image using a projector. For example, the processor may receive data for displaying content from the electronic device 101 through the communication module. The processor may display content on at least a portion of the display device 350 on the basis of the received data. The processor may identify the position to which an image is to be output based at least on the relative position of the electronic device 101 with respect to the AR glasses 301. Alternatively, the processor may receive information on the display position along with data for displaying content through the communication module. The processor may also identify the position to which an image is to be output on the basis of the relative position of the electronic device 101 with respect to the AR glasses 301 and information on the received display position. A configuration in which the processor identifies the relative position of the electronic device 101 with respect to the AR glasses 301 and a configuration in which the processor identifies the display position of content in various ways will be described later in more detail. The processor may display content at the identified position on the display device 350. For example, the content may be displayed at a position where the user recognizes the content as being displayed in the vicinity of the display device 160 of the electronic device 101.

According to various embodiments, the processor of the AR glasses may be implemented to be at least partially the same as the processor 120 of the electronic device 101 in FIG. 1. The communication module of the AR glasses may be implemented to be at least partially the same as the communication module of the electronic device 101 in FIG. 1. The communication module of the AR glasses may transmit/receive data to/from the communication module 190 of the electronic device 101 through at least one of the first network 198 or the second network 199.

According to various embodiments, another one of the circuit boards 360 may be provided as a circuit board on which an interface with a user, a communication module for providing connection with another electronic device or a commercial communication network, various connectors, and sensor modules are mounted. As another example, a microphone and a speaker phone for input/output of sound may also be disposed on one of the circuit boards 360, or may be disposed adjacent to one of the circuit boards 360. However, the circuit arrangement of the circuit boards 360 and their functions are not limited thereto, and may be variously modified as necessary.

According to an embodiment, the circuit boards 360 may be respectively disposed in any one of the wearing members 320. As another example, the sensor module may include a proximity sensor, an illuminance sensor, a gyro sensor, a camera module, an eye tracker, a geomagnetic sensor, an accelerometer, and the like, and various sensors constituting the sensor module are not necessarily installed on one of the circuit boards 360. For example, the camera module may be disposed at an appropriate position on the pair of housings 310 to be close to the user's gaze. The sensor module may detect information on the surrounding environment required to configure an optimal usage environment while monitoring the usage environment of the AR glasses 301. For example, the processor may analyze an image of an external landscape obtained through the camera module and identify a relative position of the electronic device 101 with respect to the AR glasses 301 based at least on the analysis result.

According to an embodiment, one or more batteries 370 may be disposed to supply power to the circuit board 360, the display module, or the like, and may be disposed in at least one of the pair of wearing members 320 or may be disposed in each wearing member 320.

According to an embodiment, a plurality of light output devices 380 and a plurality of light refraction modules 390 may be disposed, and may be disposed in at least one of the pair of wearing members 320, or may be disposed in each wearing member 320. The light emitted from the light output device 380 may reach the display device 350 passing through the light refraction module 390. The AR glasses 301 using the light output device 380 may be a wave guide type or a reflective mirror type. For example, in the wave guide type, light emitted from a side light output device such as a projector is reflected onto a grating area formed in the display device using a wave guide such as a prism and is then transmitted to the user's eyes. As another example, in the reflective mirror type, light emitted from a light output device may be directly reflected onto a display device in front of the user's eyes to provide visual information to the user's eyes.

According to an embodiment, the circuit boards 360 disposed on the respective housings 310 may be connected to each other through circuit wires (not shown). The circuit wires may provide a transmission/reception path for various control signals and data between circuit boards. The circuit wire may be configured using a coaxial cable, and may have various other types of transmission line structures such as a flexible printed circuit board (FPCB) and the like.

According to an embodiment, the AR glasses 301 may include an input device including physical keys or a touch pad. For example, an input module such as a power key or a touch pad requires direct contact with a user and thus may be exposed to the outside of the AR glasses 301.

Figure 4:
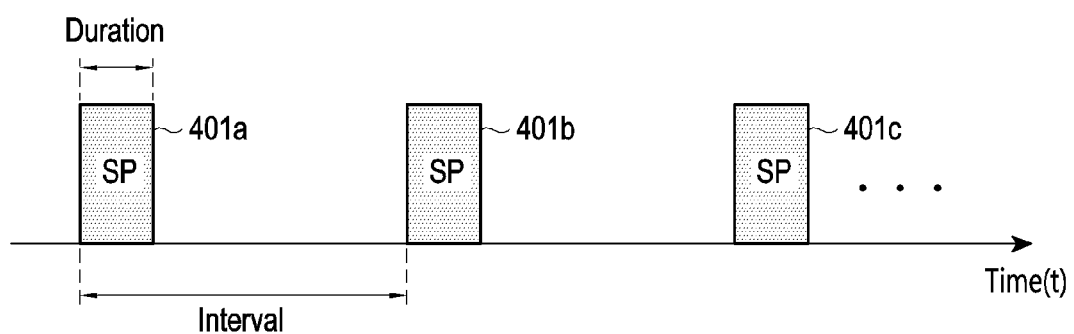
FIG. 4 is a diagram illustrating a method of scheduling a service period for a wireless channel of an electronic device and an external electronic device according to various embodiments.

FIG. 4 is a diagram illustrating a method of scheduling a service period for a wireless channel of an electronic device (e.g., the electronic device 101 in FIG. 1) and an external electronic device (e.g., the external electronic device 205 in FIG. 2) according to various embodiments.

In FIG. 4, the service periods (SPs) 401a, 401b, and 401c are shown. The electronic device 101 and the external electronic device 205 may operate in a wake-up state during the service periods 401a, 401b, and 401c and enter a sleep state within the remaining periods. Data for generating and/or reproducing one or more augmented reality image frames may be transmitted and/or received during each of the service periods 401a, 401b, and 401c. Although not shown, the service period may be repeated at a predetermined interval.

According to various embodiments, the duration of each of the service periods 401a, 401b, and 401c may be determined by the amount of data to be transmitted from the electronic device 101 to the external electronic device 205 (hereinafter referred to as a "first data amount"), the amount of data to be transmitted from the external electronic device 205 to the electronic device 101 by (hereinafter referred to as a "second data amount"), and/or a network bandwidth.

For example, information on the first data amount and/or the second data amount may be identified from an augmented reality-related application executed in the electronic device 101 and the external electronic device 205.

For example, information on the network bandwidth may be identified on the basis of information on the communication scheme for a connection between the electronic device 101 and the external electronic device 205 and/or the quality of a signal (e.g., the intensity of a received signal). For example, if the electronic device 101 and the external electronic device 205 are connected in a WiFi communication scheme or a WiFi direct communication scheme (hereinafter referred to as a "WiFi communication scheme"), a transmittable data rate set may be determined according to WLAN standards. For example, if the electronic device 101 and the external electronic device 205 use a bandwidth of 160 MHz based on the IEEE 802.11ax standard and a multi-input multi-output (MIMO) scheme of two spatial streams, the peak data rate may be 2.4 Gbps, and any one data rate among a set of supported data rates defined in the IEEE 802.11ax standard may be selected on the basis of the intensity of a received signal. For example, if the intensity of a received signal is sufficiently high, a data rate of 2.4 Gbps may be selected from among the supported data rate set defined in the IEEE 802.11ax standard, thereby performing communication, and the network bandwidth may be determined to be 1.8 Gbps, which corresponds to 75% of the selected data rate of 2.4 Gbps, in consideration of the overhead included in the packet to be transmitted.

For example, the duration of each of the service periods 401*a*, 401*b*, and 401*c* may be determined to be greater than or equal to a value obtained by dividing a sum of the data amounts transmitted and/or received per unit time between the electronic device 101 and the external electronic device 205 by the network bandwidth. For example, if the sum of the first data amount and the second data amount transmitted and/or received per unit time is 1.8 Mbits, and if the network bandwidth is 1.8 Gbps, the duration of each of the service periods 401*a*, 401*b*, and 401*c* may be determined to be 1 ms or more, which is obtained by dividing the sum of data amounts (i.e., 1.8 Mbits) by the network bandwidth (i.e., 1.8 Gbps). As another example, the duration of each of the service periods 401*a*, 401*b*, and 401*c* may be determined to be 2 ms which is double the value determined in the previous example, in order to guarantee sufficient retransmission time in consideration of variables such as a network overhead, interference, and/or possibility of retransmission. However, the duration of each service period according to various embodiments of the disclosure is not limited thereto.

According to various embodiments, the interval of the service periods 401*a*, 401*b*, and 401*c* may be determined on the basis of a refresh rate of the external electronic device 205. For example, if the external electronic device 205 reproduces an augmented reality image at a refresh rate of 60 fps and outputs the same through a display device (e.g., the display device 350 in FIG. 3), the interval of the service periods 401*a*, 401*b*, and 401*c* may be determined to be about 16.6 ms or less, which is the reciprocal of the refresh rate.

In the disclosure, the service period scheduled to enable the electronic device 101 and/or the external electronic device 205 to transmit and/or receive data will be referred to as a "target-wake-time (TWT) service period (SP)", the duration of the period in which the electronic device 101 and/or the external electronic device 205 operate in a wake-up state in order to transmit and/or receive data during the scheduled service period will be referred to as a "TWT wake duration", and the interval of the scheduled service period (e.g., the duration of the time between the starting time of one TWT service period and the starting time of the next TWT service period) will be referred to as a "TWT wake interval".

Figure 5:
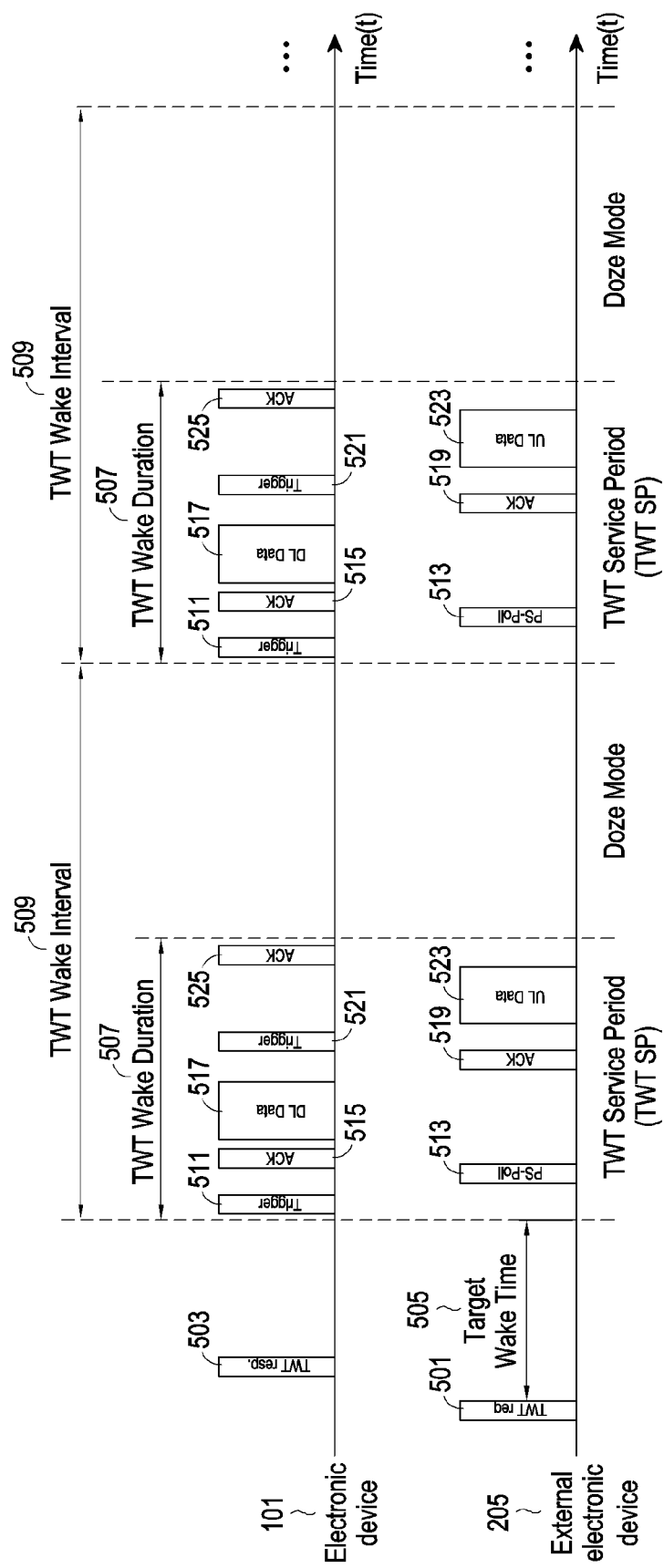
FIG. 5 is a diagram illustrating a method of transmitting and/or receiving data between an electronic device and an external electronic device according to various embodiments.

FIG. 5 is a diagram illustrating a method of transmitting and/or receiving data between an electronic device 101 and an external electronic device 205 according to various embodiments.

Referring to FIG. 5, in the case of TWT setup between the electronic device 101 and the external electronic device 205, the external electronic device 205 may operate as a device (e.g., a TWT requesting STA) that requests the TWT setup, and the electronic device 101, which is a computing host, may operate as a device (e.g., a TWT responding STA) that responds to the TWT setup. Unlike the illustrated example, the external electronic device 205 may operate as a device (e.g., a TWT responding STA) that responds to the TWT setup, and the electronic device 101 may operate as a device (e.g., a TWT requesting STA) that requests the TWT setup.

According to various embodiments, the external electronic device 205 may transmit a message requesting TWT setup (e.g., a TWT request frame 501) to the electronic device 101. According to various embodiments, if the message requesting TWT setup (e.g., the TWT request frame 501) is received, the electronic device 101 may transmit a response message (e.g., a TWT response frame 503) including information on the parameters for the TWT service period. For example, the parameters for the TWT service period may include at least one of a target wake time 505, a TWT wake duration 507, and/or a TWT wake interval 509. For example, the target wake time 505 may be a parameter indicating the time at which the TWT service period starts. For example, the TWT wake duration 507 may be a parameter indicating the duration of the TWT service period. For example, the TWT wake interval 509 may be a parameter indicating the interval at which the TWT service period repeatedly starts. According to various embodiments, the external electronic device 205 that requested TWT setup may receive the response message and identify a set TWT service period on the basis of the parameters included in the received response message.

According to various embodiments, when the TWT service period starts, the electronic device 101 may transmit a trigger frame 511 to the external electronic device 205. For example, the trigger frame 511 may be a control frame that requests (e.g., triggers) the uplink (UL) operation (e.g., transmission of uplink traffic) of the external electronic device 201. According to various embodiments, when the TWT service period starts, the external electronic device 505 may transmit a power saving (PS)-poll frame 513 to the electronic device 101 in order to notify the electronic device 101 that the external electronic device 505 is in a wake-up state. According to an embodiment, the PS-poll frame 513 transmitted to the electronic device 101 may be replaced by a quality-of-service (QoS) null frame. For example, the PS-poll frame 513 may be a control frame that requests the device 101 to transmit buffered data frames after the external electronic device 205 switches from a doze mode to a wake-up mode in order to receive the data frames buffered in the electronic device 101. According to various embodiments, if the PS-poll frame 513 is received, the electronic device 101 may transmit an ACK message 515 including reception of the PS-poll frame 513 and transmit downlink data (DL) data 517 to the external electronic device 205. According to various embodiments, if the downlink data 517 is received, the external electronic device 205 may transmit an ACK message 519 including reception of the downlink data 517 to the electronic device 101. For example, the ACK message 519 may include information indicating at least one data frame received from the electronic device 101 through the downlink. According to various embodiments, if the ACK message 519 is received, the electronic device 101 may identify that at least one data frame among one or more data frames transmitted to the external electronic device 205 was received by the external electronic device 205. According to various embodiments, the electronic device 101 may transmit a trigger frame 521 to the external electronic device 205 after the ACK message 519 is received. For example, the trigger frame 521 may be a control frame that requests (e.g., triggers) the uplink operation of the external electronic device 205. According to various embodiments, if the trigger frame 521 is received, the external electronic device 205 may transmit uplink data 523 to the electronic device 101. According to various embodiments, if the uplink data 523 is received, the electronic device 101 may transmit an ACK message 525 including reception of the uplink data 523 to the external electronic device 205. For example, the ACK message 525 may include information indicating at least one data frame received from the external electronic device 205 through the uplink. According to various embodiments, the external electronic device 205 may switch to the doze state if the set TWT service period elapses. Thereafter, the external electronic device 205 may switch to the wake-up mode according to the determined TWT wake interval and perform transmission and/or reception of messages and/or data with the electronic device 101 described above.

According to various embodiments, the electronic device 101 may not transmit the trigger frame 511 if there is no more downlink data to be transmitted. According to various embodiments, the external electronic device 205 may not transmit the PS-poll frame 513 if there is no more uplink data to be transmitted.

Unlike the above description, when the first TWT service period starts after the TWT setup, the trigger frame 511 and/or the PS-poll frame 513 may not be transmitted. For example, in the case of TWT setup, only one of the trigger frame 511 and the PS-poll frame 513 may be transmitted, or none of them may be transmitted according to the value of a sub-field "Trigger" and the value of a sub-field "Flow Type" exchanged between the electronic device 101 and the external electronic device 205. For example, if the value of the sub-field "Trigger" is configured as 0, the trigger frame 511 may not be transmitted when the first TWT service period starts after the TWT setup. In this case, the external electronic device 205 may perform the uplink operation even if the trigger frame 511 is not received. Alternatively, if the value of the sub-field "Trigger" is configured as 1, the trigger frame 511 may be transmitted when the first TWT service period starts after the TWT setup. For example, if the value of the sub-field "Flow Type" is configured as 0, the PS-poll frame 513 may be transmitted when the TWT service period starts after the TWT setup. Alternatively, if the value of the sub-field "Flow Type" is configured as 1, the PS-poll frame 513 may not be transmitted when the TWT service period starts after the TWT setup.

Unlike the illustrated example, configuration may be made such that the external electronic device 205 transmits the uplink data 523 and then the electronic device 101 transmits the downlink data 517 during each TWT service period, and the sequence of transmission of the downlink data 517 and uplink data 523 may be respectively configured for each TWT service period.

Figure 6:
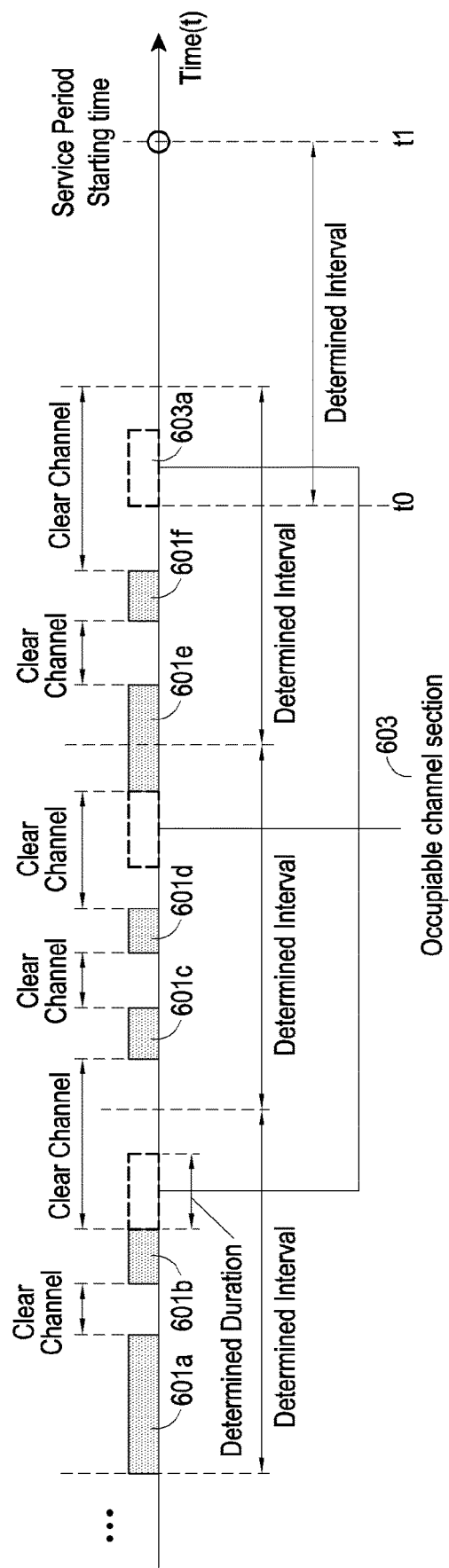
FIG. 6 is a diagram illustrating a method in which an electronic device and/or an external electronic device determine the time at which a TWT service period starts according to various embodiments.

FIG. 6 is a diagram illustrating a method in which an electronic device (e.g., the electronic device 101 in FIG. 1) and/or an external electronic device (e.g., the external electronic device 205 in FIG. 2) determine the time at which a TWT service period starts according to various embodiments.

According to various embodiments, the electronic device 101 and/or the external electronic device 205 may monitor the wireless channel for a specified time. For example, the specified time may be double the determined TWT wake interval (e.g., Determined Interval) or more.

According to various embodiments, the electronic device 101 and/or the external electronic device 205 may detect a packet transmitted through the wireless channel for transmitting and/or receiving data and periodically identify whether or not there is an occupiable channel section (e.g., a section that is not wirelessly occupied by other external electronic devices). For example, referring to FIG. 6, the electronic device 101 and/or the external electronic device 205 may identify one or more sections 601*a*, 601*b*, 601*c*, 601*d*, 601*e*, and 601*f* that are wirelessly occupied by one or more other external electronic devices as a result of monitoring the wireless channel. The electronic device 101 and/or the external electronic device 205 may identify sections that are not wirelessly occupied by other external electronic devices (e.g., clear channels) during a specified time during which the monitoring is performed on the basis of the one or more identified sections 601*a*, 601*b*, 601*c*, 601*d*, 601*e*, and 601*f* that are wirelessly occupied by one or more other external electronic devices. For example, the electronic device 101 and/or the external electronic device 205 may identify that the sections, which are not wirelessly occupied, greater than or equal to the determined TWT wake duration (e.g., the determined duration), among the sections (e.g., clear channels) that are not wirelessly occupied by other external electronic devices, are periodically repeated at the determined TWT wake interval (e.g., the determined interval). The electronic device 101 and/or the external electronic device 205 may stop monitoring the wireless channel and identify an occupiable channel section 603 on the basis of the identified result.

According to various embodiments, the electronic device 101 and/or the external electronic device 205 may determine the time at which the TWT service period starts on the basis of the identified occupiable channel section 603. For example, the electronic device 101 and/or the external electronic device 205 may determine the time ti after the determined TWT wake interval (e.g., the determined interval) from the starting time to of the last section 603*a* in the identified occupiable channel section 603 as the time at which the TWT service period starts.

According to various embodiments, the external electronic device 205 may transmit, to the electronic device 101, a request message (e.g., the TWT request frame 501 in FIG. 5) including a parameter (e.g., the target wake time 505 in FIG. 5) indicating the determined time at which the TWT service period starts.

According to various embodiments, the electronic device 101 may transmit, to the external electronic device 205, a response message (e.g., the TWT response frame 503 in FIG. 5) including the parameter (e.g., the target wake time 505 in FIG. 5) indicating the determined time at which the TWT service period starts.

Figure 7:
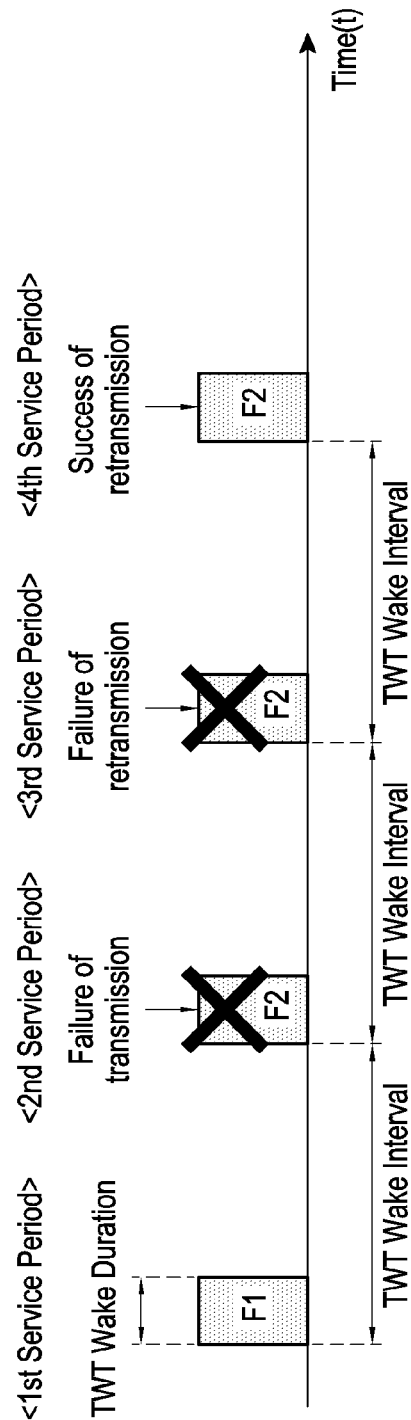
FIG. 7 is a diagram illustrating an example in which latency increases due to retransmission of a data frame according to various embodiments.

FIG. 7 is a diagram illustrating an example in which latency increases due to retransmission of a data frame according to various embodiments. Hereinafter, the case where a data frame transmitted by an electronic device (e.g., the electronic device 101 in FIG. 1) is retransmitted will be described.

According to various embodiments, the electronic device 101 may transmit a data frame to an external electronic device (e.g., the external electronic device 205 in FIG. 2) according to a set TWT service period.

Referring to FIG. 7, a data frame (e.g., F1) may be transmitted within a TWT service period (e.g., a $1^{st}$ service period). If the entire data frame (e.g., F1) is transmitted within the TWT service period (e.g., the $1^{st}$ service period), and if the entire transmitted data frame (e.g., F1) is received by the external electronic device 205, the electronic device 101 may perform an operation of transmitting the next data frame (e.g., F2) within the next service period (e.g., a $2^{nd}$ service period). If at least a portion of the data frame (e.g., F2) is not transmitted within the service period (e.g., the $2^{nd}$ service period), or if at least a portion of the transmitted data frame (e.g., F2) is not received by the external electronic device 205 due to issues such as wireless channel interference, congestion, and/or low signal quality (e.g., failure of transmission of the data frame (e.g., F2)), the electronic device 101 may perform an operation of retransmitting the data frame (e.g., F2) that could not be transmitted normally to the external electronic device 205 during the next service period (e.g., a $3^{rd}$ service period). Accordingly, latency of the TWT wake interval may occur. If failure of transmission of the data frame (e.g., F2) also occurs during the service period (e.g., the $3^{rd}$ service period), the electronic device 101 may again perform the operation of retransmitting the data frame (e.g., F2) during the next service period (e.g., a $4^{th}$ service period). Even if the entire data frame (e.g., F2) is transmitted within the service period (e.g., the $4^{th}$ service period) and is thus received by the external electronic device 205, total latency may be double the TWT wake interval. Accordingly, there may be a problem with latency in transmission of the data frames to be transmitted subsequent to the data frame (e.g., F2) in which failure of transmission described above occurs.

Figure 8:
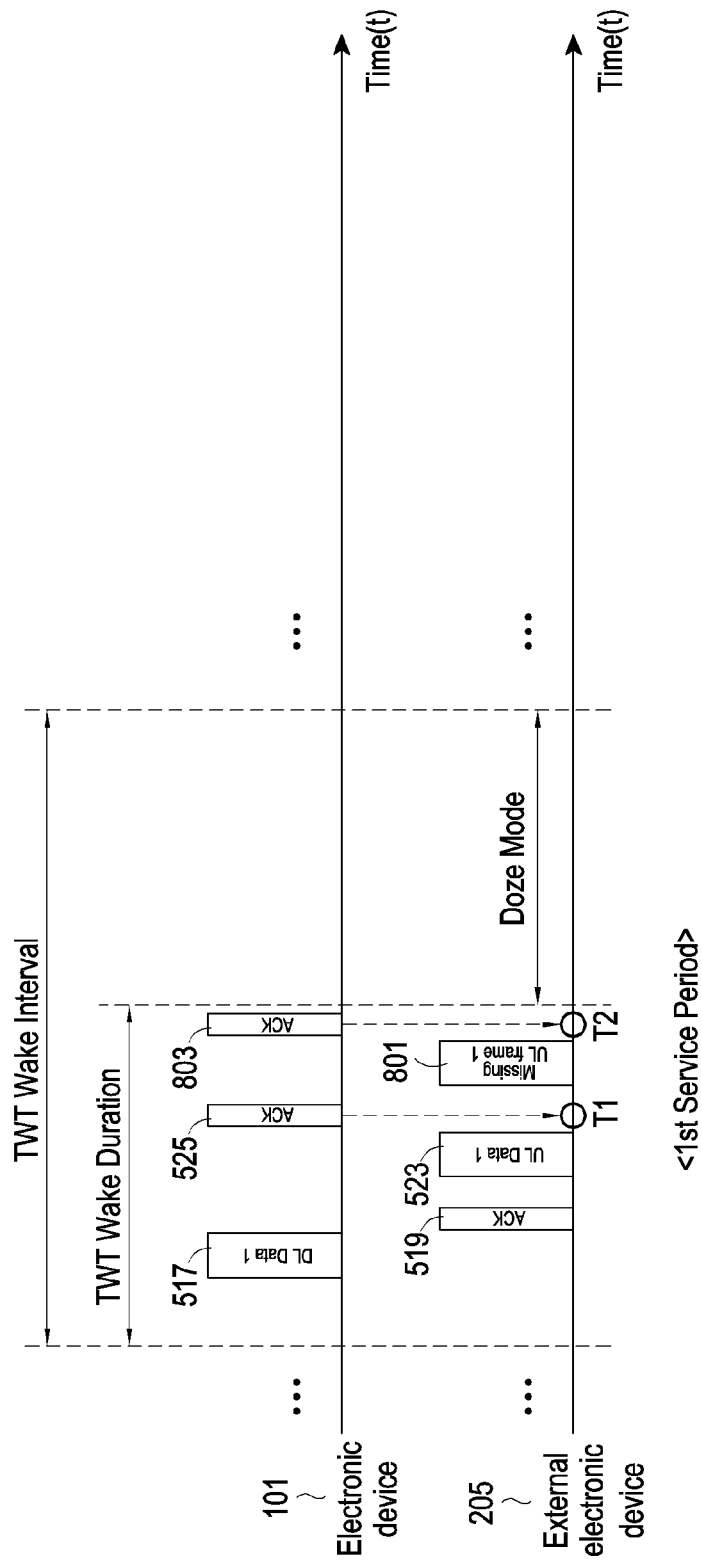
FIG. 8 is a diagram illustrating a method in which an electronic device and/or an external electronic device control latency due to failure of transmission according to various embodiments.

FIG. 8 is a diagram illustrating a method in which an electronic device 101 and/or an external electronic device 205 control latency due to failure of transmission according to various embodiments. A description will be made below with reference to FIG. 5 as well.

According to various embodiments, transmission and/or reception of data between the electronic device 101 and the external electronic device 205 may be performed within a TWT service period.

Referring to FIG. 8, the electronic device 101 may transmit downlink data 517 to the external electronic device 205 within a TWT service period (e.g., the $1^{st}$ service period). According to various embodiments, if the downlink data 517 is received, the external electronic device 205 may transmit, to the electronic device 101, an ACK message 519 indicating reception of the downlink data 517. According to various embodiments, if the ACK message 519 is received, the electronic device 101 may identify at least one data frame received by the external electronic device 205, among one or more data frames transmitted to the external electronic device 205, on the basis of information included in the received ACK message 519. According to various embodiments, if all of the one or more transmitted data frames are identified to have been received by the external electronic device 205, the electronic device 101 may transmit a trigger frame (e.g., the trigger frame 521 in FIG. 5) to the external electronic device 205, thereby controlling the external electronic device 205 to perform an uplink operation.

According to various embodiments, if the trigger frame 521 is received, the external electronic device 205 may transmit uplink data 523 to the electronic device 101. According to various embodiments, if the uplink data 523 is received, the electronic device 101 may transmit, to the external electronic device 205, an ACK message 525 indicating reception of the uplink data 523. According to various embodiments, if the ACK message 525 is received, the external electronic device 205 may identify whether or not there are one or more missing frames at the time T1 at which the ACK message 525 is received. For example, if the ACK message 525 is received, the external electronic device 205 may identify at least one data frame received by the electronic device 101, among one or more data frames transmitted to the electronic device 101, on the basis of information included in the received ACK message 525. For example, frame numbers may be configured for the respective data frames transmitted from the external electronic device 205 to the electronic device 101, and then a plurality of data frames having the configured frame numbers may be transmitted to the electronic device 101. According to an embodiment, the electronic device 101 may include, in the ACK message 252, information on the number of at least one data frame transmitted from the external electronic device 205 and received by the electronic device 101. According to an embodiment, the electronic device 101 may transmit, to the external electronic device 205, the ACK message 525 including information on the number of at least one data frame received by the electronic device 101. According to an embodiment, the electronic device 101 may parse the ACK message 525 transmitted from the external electronic device 205 to identify the frame number included in the ACK message 525, and compare the same with the frame numbers for one or more data frames transmitted to the electronic device 101, thereby identifying at least one data frame received by the electronic device 101.

According to various embodiments, if it is identified that at least some of the one or more transmitted data frames have not been received by the electronic device 101, the external electronic device 205 may determine at least some data frames, which have not been received by the electronic device 101, to be missing frames. For example, if the ACK message 525 is not received from the electronic device 101, the external electronic device 205 may identify that none of the one or more data frames transmitted to the electronic device 101 have been received by the electronic device 101, and determine one or more transmitted data frames to be missing frames. According to various embodiments, if it is identified that there are one or more missing frames, the external electronic device 205 may retransmit one or more missing frames 801 in the uplink data 523 to the electronic device 101 within the TWT service period (e.g., the $1^{st}$ service period). According to various embodiments, the external electronic device 205 may identify whether or not one or more missing frames 801 are able to be transmitted within the remaining period (e.g., before the expiration of the TWT service period (e.g., the $1^{st}$ service period) after the time T1) of the TWT service period (e.g., the $1^{st}$ service period), and then retransmit one or more missing frames 801. For example, the external electronic device 205 may identify the time required to transmit all of the one or more missing frames 801 on the basis of a network bandwidth or a bit rate, and, if the time required to transmit all of the one or more missing frames 801 is less than or equal to the remaining period of the TWT service period (e.g., the $1^{st}$ service period), determine that the one or more missing frames 801 are able to be transmitted, and transmit the one or more missing frames 801 within the remaining period of the corresponding TWT service period (e.g., the $1^{st}$ service period). For example, in the external electronic device 205, if the duration of at least one missing frame 801 is 0.09 Mbits, and if the network bandwidth or the bit rate is 1.8 Gbps, the time required to transmit all of the one or more missing frames 801 may be 0.05 ms. In this case, if the remaining period of the TWT service period (e.g., the $1^{st}$ service period) is 0.05 ms or more, it may be determined that the one or more missing frames 801 are able to be transmitted.

If it is identified that the time required to transmit all of the one or more missing frames 801 exceeds the remaining period of the TWT service period (e.g., the $1^{st}$ service period) (e.g., if the remaining period of the TWT service period (e.g., the $1^{st}$ service period) is less than 0.05 ms), the external electronic device 205 may determine that the one or more missing frames 801 are unable to be transmitted. If it is determined that one or more missing frames 801 are unable to be transmitted within the remaining period of the TWT service period (e.g., the $1^{st}$ service period), the external electronic device 205 may retransmit the one or more missing frames 801 in the next TWT service period, or may adjust the target wake time of the TWT service period and then transmit the one or more missing frames 801 during a new TWT service period, which will be described later in more detail with reference to the drawings.

According to various embodiments, if at least one missing frame 801 is received, the electronic device 101 may transmit, to the external electronic device 205, an ACK message 803 indicating reception of at least some of one or more missing frames 801. According to various embodiments, if the ACK message 803 is received, the external electronic device 205 may identify whether or not one or more missing frames 801 have been received by the electronic device 101 at a time T2 at which the ACK message 803 is received. For example, the ACK message 803 may include information indicating at least some missing frames received by the electronic device 101 among the one or more missing frames transmitted to the electronic device 101. According to various embodiments, the external electronic device 205 may identify whether or not all of the one or more missing frames have been received by the electronic device 101 on the basis of information included in the received ACK message 803. According to various embodiments, if it is identified that all of the one or more missing frames have been received by the electronic device 101, the external electronic device 205 may switch to a doze state and then perform an operation corresponding to the next TWT service period. According to various embodiments, if it is identified that at least one of the one or more missing frames has not been received by the electronic device 101, the external electronic device 205 may identify whether or not at least one missing frame, which has not been received by the electronic device 101, is able to be transmitted within the remaining period (e.g., before the expiration of the TWT service period (e.g., the 1$^{st}$ service period) after the time T2) of the TWT service period (e.g., the 1st service period), and retransmit at least one missing frame. If it is identified that at least one missing frame is unable to be transmitted within the remaining period of the TWT service period (e.g., the 1$^{st}$ service period), the external electronic device 205 may retransmit the at least one missing frame in the next TWT service period (including both the TWT service period closest to the current TWT service period and a TWT service period subsequent thereto in time), or may adjust the target wake time of the TWT service period and then transmit the at least one missing frame during a new TWT service period. According to various embodiments, in the case of retransmitting at least one missing frame in the next TWT service period (e.g., the TWT service period closest to the current TWT service period in time), when the next TWT service period starts, the external electronic device 205 may further perform the operation of identifying whether or not the missing frames are able to be transmitted during the next TWT service period.

Although it has been described in FIG. 8 that the external electronic device 205 receives the entire downlink data 517 of the electronic device 101, there may be one or more missing frames with respect to the downlink data 517, and in this case, the electronic device 101 may perform the operations of the external electronic device 205 in the same manner. For example, according to an embodiment, the electronic device 101 may transmit the downlink data 517 to the external electronic device 205. According to an embodiment, the electronic device 101 may receive, from the external electronic device 205, information (e.g., the ACK message) on at least one data frame received by the external electronic device 205. According to an embodiment, the electronic device 101 may identify a missing data frame of the downlink data 517 on the basis of the information (e.g., the ACK message) on at least one data frame received by the external electronic device 205. According to an embodiment, the electronic device 101 may determine whether or not the missing data frame is able to be transmitted to the external electronic device 205 within the TWT service period. If it is determined that the missing data frame is able to be transmitted to the external electronic device 205 within the TWT service period, according to an embodiment, the electronic device 101 may transmit the missing data frame to the external electronic device 205 during the TWT service period. If there are one or more missing frames for the downlink data 517, the electronic device 101 may delay transmission of a trigger frame (e.g., the trigger frame 521 in FIG. 5) until retransmission of one or more missing frames are completed.

Although it has been described in FIG. 8 that the external electronic device 205 transmits the uplink data 523 after the electronic device 101 transmits the downlink data 517, the electronic device 101 may transmit the downlink data 517 after the external electronic device 205 transmits the uplink data 523.

Figure 9A:
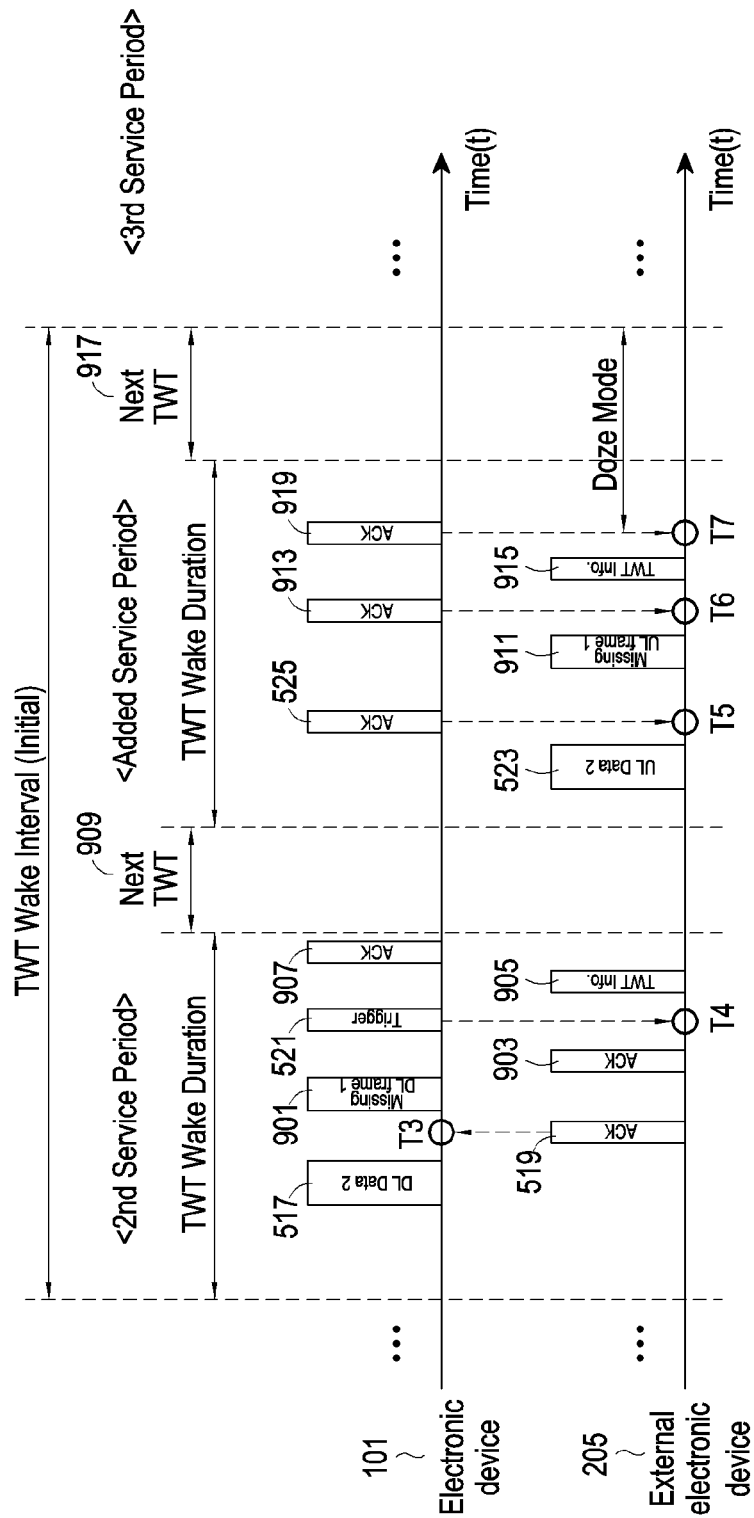
FIG. 9A is a diagram illustrating a method in which an electronic device and/or an external electronic device control latency due to failure of transmission according to various embodiments.
Figure 9B:
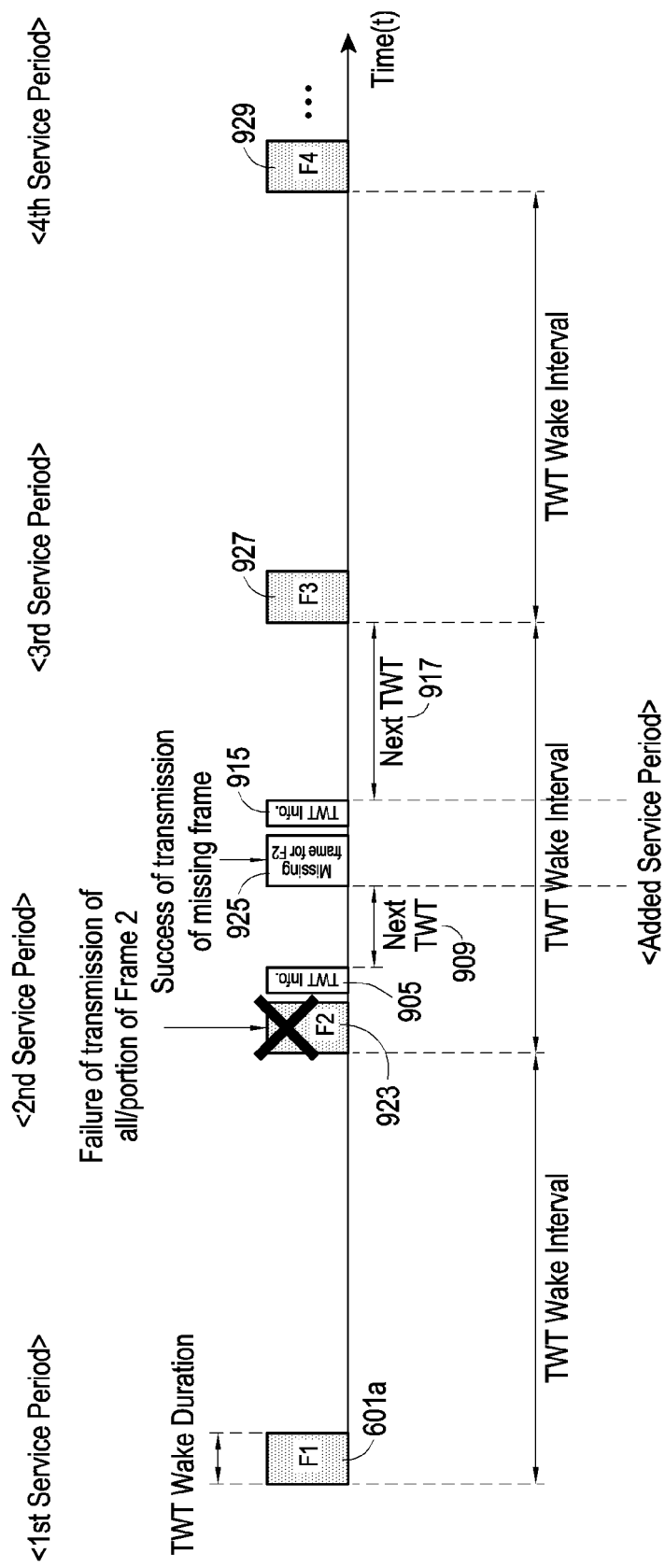
FIG. 9B is a diagram illustrating a method in which an electronic device and/or an external electronic device control latency due to failure of transmission according to various embodiments.

FIG. 9A is a diagram illustrating a method in which an electronic device 101 and/or an external electronic device 205 control latency due to failure of transmission according to various embodiments. FIG. 9B is a diagram illustrating a method in which an electronic device 101 and/or an external electronic device 205 control latency due to failure of transmission according to various embodiments. Hereinafter, a description will be made with reference to FIG. 5 as well. A duplicate of a description that has been made in FIG. 8 will be omitted below.

According to various embodiments, transmission and/or reception of data between the electronic device 101 and the external electronic device 205 may be performed during a TWT service period.

Referring to FIG. 9A, the electronic device 101 may transmit downlink data 517 to the external electronic device 205 within the TWT service period (e.g., the 2nd service period). According to various embodiments, if the downlink data 517 is received, the external electronic device 205 may transmit, to the electronic device 101, an ACK message 519 indicating reception of the downlink data 517. According to various embodiments, if the ACK message 519 is received, the electronic device 101 may identify whether or not there are one or more missing frames at a time T3 at which the ACK message 519 is received. For example, if the ACK message 519 is received, the electronic device 101 may identify at least one data frame received by the external electronic device 205, among one or more data frames transmitted to the device 205, on the basis of information included in the received ACK message 519 (e.g., information on the number of the received data frame). If it is identified that at least some of the one or more transmitted data frames have not been received by the external electronic device 205, the electronic device 101 may determine at least some of the data frames, which have not been received by the electronic device 205, as missing frames. For example, if the ACK message 519 is not received from the external electronic device 205, the electronic device 101 may identify that none of the one or more data frames transmitted to the external electronic device 205 have been received by the external electronic device 205, and determine one or more transmitted data frames as missing frames. According to various embodiments, if it is identified that there are one or more missing frames, the electronic device 101 may retransmit one or more missing frames 901 in the downlink data 517 to the external electronic device 205 within the TWT service period (e.g., the $2^{nd}$ service period). According to various embodiments, the electronic device 101 may identify whether or not one or more missing frames 901 are able to be transmitted within the remaining period (e.g., before the expiration of the TWT service period (e.g., the $2^{nd}$ service period) after the time T3) of the TWT service period (e.g., the $2^{nd}$ service period), and then retransmit one or more missing frames 901. If it is identified that one or more missing frames 901 are unable to be transmitted within the remaining period of the TWT service period (e.g., the $2^{nd}$ service period), the electronic device 101 may retransmit the one or more missing frames 901 in the next scheduled TWT service period, or may adjust the target wake time of the TWT service period and then transmit the one or more missing frames 901 during a new TWT service period.

According to various embodiments, if at least one missing frame 901 is received, the external electronic device 205 may transmit, to the electronic device 101, an ACK message 903 indicating reception of at least some of the one or more missing frames 901. According to various embodiments, if the ACK message 903 is received, the electronic device 101 may identify whether or not one or more missing frames 901 have been received by the external electronic device 205. For example, the ACK message 903 may include information indicating at least some missing frames received by the external electronic device 205, among one or more missing frames transmitted to the external electronic device 205. According to various embodiments, the electronic device 101 may identify whether or not all of one or more missing frames 901 have been received by the external electronic device 205 on the basis of information included in the received ACK message 903. According to various embodiments, if it is identified that all of the one or more missing frames 901 have been received by the electronic device 101, the external electronic device 205 may transmit a trigger frame (e.g., the trigger frame 521 in FIG. 5) to the external electronic device 205, thereby controlling the external electronic device 205 to perform an uplink operation.

According to various embodiments, if the trigger frame 521 is received, the external electronic device 205 may identify whether or not uplink data (e.g., the uplink data 523 in FIG. 5) is able to be transmitted within the remaining period (e.g., before the expiration of the TWT service period (e.g., the $2^{nd}$ service period) after a time T4) of the TWT service period (e.g., the 2nd service period) at the time T4 at which the trigger frame 521 is received. The external electronic device 205 may identify the time required to transmit uplink data (e.g., the uplink data 523 in FIG. 5) on the basis of a network bandwidth or a bit rate, and, if it is identified that the time required to transmit uplink data (e.g., the uplink data 523 in FIG. 5) exceeds the remaining period of the TWT service period (e.g., the 2nd service period), may determine that the uplink data (e.g., the uplink data 523 in FIG. 5) is unable to be transmitted. According to various embodiments, the external electronic device 205 may determine the uplink data (e.g., the uplink data 523 in FIG. 5) that failed to be transmitted as a missing frame. If it is identified that the uplink data (e.g., the uplink data 523 in FIG. 5) is unable to be transmitted, in order to adjust the target wake time of the next TWT service period, the external electronic device 205 may transmit, to the electronic device 101, a message (e.g., a TWT information frame 905) including information indicating the starting time of the next TWT service period. For example, the information indicating the starting time of the next TWT service period may include information (e.g., next TWT information) indicating the time at which a new TWT service period (e.g., an added service period) starts from the end time of the TWT service period (e.g., the $2^{nd}$ service period) during which the message (e.g., the TWT information frame 905) was transmitted (hereinafter, a starting time value of the next TWT service period) (e.g., the next TWT 909) (e.g., 2 ms from the end time of the TWT service period (e.g., the $2^{nd}$ service period)). For example, the starting time value of the next TWT service period may be determined within the time range obtained by excluding the TWT wake duration and the TWT wake duration of a new added TWT service period (e.g., the added service period) from the TWT wake interval. As another example, the starting time value of the next TWT service period, for example, may be configured to have the same duration as the TWT service period, may be preconfigured, or may be configured to have a duration corresponding to an integer multiple of the TWT service period. As another example, the starting time value of the next TWT service period may be determined within a range such that the new added TWT service period (e.g., the added service period) does not overlap the TWT service period of another external electronic device. For example, if the electronic device 101 is communicating or is to communicate with another external electronic device during the determined time interval (e.g., the interval between the end time of the TWT service period (e.g., the $2^{nd}$ service period) and the next TWT 909), the external electronic device 205 may wait until the communication with another external electronic device is terminated and then initiate the new TWT service period (e.g., the added service period). According to various embodiments, the external electronic device 205 may identify that the electronic device 101 is communicating or is to communicate with another external electronic device before the starting time of the next determined TWT service period by receiving, from the electronic device 101, information (e.g., a trigger frame, RTS (ready-to-send or request-to-send), and/or CTS (clear-to-send)) indicating that the electronic device 101 is communicating or is to communicate with another external electronic device.

If the message (e.g., the TWT information frame 905) is received, the electronic device 101 may transmit, to the external electronic device 205, an ACK message 907 indicating reception of the message (e.g., the TWT information frame 905). According to various embodiments, if the time required to transmit uplink data (e.g., the uplink data 523 in FIG. 5) is identified to be less than or equal to the remaining period of the TWT service period (e.g., the $2^{nd}$ service period) on the basis of the network bandwidth, the external electronic device 205 may determine that the uplink data (e.g., the uplink data 523 in FIG. 5) is able to be transmitted and transmit the uplink data (e.g., the uplink data 523 in FIG. 5) within the remaining period of the TWT service period (e.g., the $2^{nd}$ service period).

According to various embodiments, the electronic device 101 may identify a new TWT service period (e.g., the added service period) on the basis of the message (e.g., the TWT information frame 905) including information indicating the starting time of the next TWT service period. According to various embodiments, the new TWT service period (e.g., the added service period) may have the TWT wake interval and/or the TWT wake duration corresponding to the TWT service period initially configured by the electronic device 101 and/or the external electronic device 205. According to an embodiment, if the electronic device 101 transmits the TWT response frame 503 in FIG. 5 in order to set up a new TWT service period (e.g., the added service period), at least one of the TWT wake interval or the TWT wake duration of the new TWT service period (e.g., the added service period) may be different from the TWT wake interval and/or the TWT wake duration corresponding to the initially set TWT service period.

According to various embodiments, the external electronic device 205 may receive, from the electronic device 101, a trigger frame (not shown) that requests (e.g., triggers) an uplink operation during the new TWT service period (e.g., the added service period). According to various embodiments, if the trigger frame (not shown) is received, the external electronic device 205 may transmit the uplink data 523, which failed to be transmitted during the prior TWT service period (e.g., the $2^{nd}$ service period), to the electronic device 101 within the new TWT service period (e.g., the added service period). According to various embodiments, the external electronic device 205 may receive the ACK message 525 indicating reception of the uplink data 523 from the electronic device 101. According to various embodiments, the external electronic device 205 may identify whether or not there is a missing frame at a time T5 at which the ACK message 525 is received, and, if it is identified that there are one or more missing frames, may retransmit the one or more missing frames 911 to the electronic device 101. According to various embodiments, the external electronic device 205 may receive an ACK message 913 indicating reception of the one or more missing frames 911 from the electronic device 101. According to various embodiments, the external electronic device 205 may identify whether or not all of the one or more missing frames 911 have been received by the electronic device 101 at a time T6 at which the ACK message 913 is received. According to various embodiments, if it is identified that all of the one or more missing frames 911 have been received by the electronic device 101, in order to re-adjust the target wake time of the next TWT service period, the external electronic device 205 may transmit, to the electronic device 101, a message (e.g., a TWT information frame 915) including information indicating the starting time of the next TWT service period. For example, information indicating the starting time of the next TWT service period may include information (e.g., next TWT information) indicating the time at which the initially scheduled TWT service period (e.g., the $3^{rd}$ service period) starts from the end time of the TWT service period (e.g., the added service period) at which the message (e.g., the TWT information frame 915) is transmitted (hereinafter, a starting time value of the next TWT service period) (e.g., the next TWT 917). For example, the starting time value of the next TWT service period (e.g., the next TWT 917) may be the time obtained by excluding the TWT wake duration and the time used for retransmission of the uplink data 523 (e.g., the sum of the time of the TWT wake duration of the new TWT service period (e.g., the added service period) and the starting time value of the next TWT service period (e.g., the next TWT 909)) from the TWT wake interval.

According to various embodiments, if an ACK message 919 indicating reception of the message (e.g., the TWT information frame 915) is received after transmitting the message (e.g., TWT information frame 915) to the electronic device 101, the external electronic device 205 may switch to a doze state until the initially scheduled TWT service period (e.g., the $3^{rd}$ service period) starts.

According to various embodiments, the electronic device 101 and the external electronic device 205 may perform transmission and/or reception of data during the previously scheduled TWT service period (e.g., the $3^{rd}$ service period) determined on the basis of the starting time value of the next TWT service period (e.g., the next TWT 917).

According to the method described above, although latency occurs corresponding to the starting time value (e.g., the next TWT 909) of the next TWT service period in transmission of the uplink data 523, subsequent data is able to be transmitted and/or received during the previously scheduled TWT service period (e.g., the $3^{rd}$ service period), so no latency occurs in transmission and/or reception of the subsequent data.

FIG. 9B is a diagram obtained by simplifying FIG. 9A described above.

According to various embodiments, the electronic device 101 or the external electronic device 205 may transmit a data frame (e.g., F1 921) during a TWT service period (e.g., a $1^{st}$ service period). According to various embodiments, if it is identified that the entire data frame (e.g., F1 921) has been received by a counterpart device during the TWT service period (e.g., the $1^{st}$ service period), the electronic device 101 or the external electronic device 205 may perform an operation of transmitting the next data frame (e.g., F2 923) during the next service period (e.g., a $2^{nd}$ service period). If at least a portion of the data frame (e.g., F2 923) fails to be transmitted within the service period (e.g., the $2^{nd}$ service period) or if at least portion of the transmitted data frame (e.g., F2 923) is not received by the counterpart device due to issues such as wireless channel interference, congestion, and/or low signal quality (e.g., failure of transmission of all/some of the data frame (e.g., F2 923)), the electronic device 101 or the external electronic device 205 may transmit, to the counterpart device, a message (e.g., the TWT information frame 905) including information indicating the next TWT 909. According to various embodiments, the electronic device 101 or the external electronic device 205 may transmit, to the counterpart device, the missing frame 925 of the data frame (e.g., F2 923) during a new service period (e.g., an added service period) determined on the basis of the next TWT 909. According to various embodiments, if it is identified that the entire missing frame 925 has been received by the counterpart device, the electronic device 101 or the external electronic device 205 may transmit, to the counterpart device, a message (e.g., the TWT information frame 915) including information indicating the next TWT 917. According to various embodiments, the electronic device 101 or the external electronic device 205 may transmit corresponding data frames (e.g., F3 927 and F4 929) to the counterpart device during a previously scheduled TWT service period (e.g., a $3^{rd}$ service period and a $4^{th}$ service period) determined on the basis of the starting time value (e.g., the next TWT 917) of the next TWT service period.

According to the method described above, the electronic device 101 and/or the external electronic device 205 may transmit a corresponding data frame during each TWT service period after initial TWT setup, identify whether or not retransmission of the missing frame is possible within the remaining TWT service period if a missing frame occurs during each TWT service period, and reschedule the next TWT service period if retransmission of the missing frame is not possible within the remaining TWT service period, thereby minimizing the latency caused by the occurrence of the missing frame.

Figure 10A:
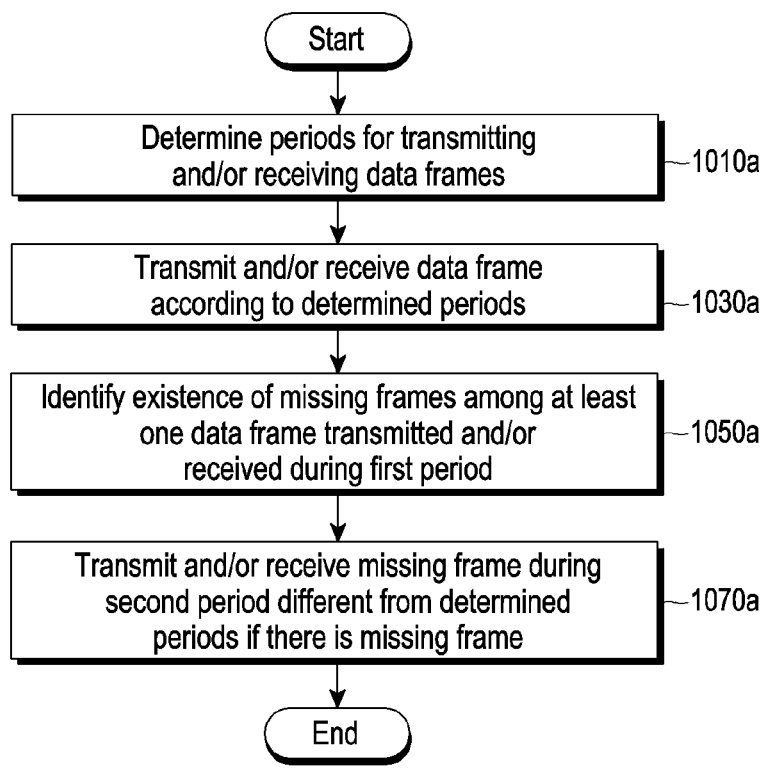
FIG. 10A is a flowchart illustrating a method in which an electronic device and/or an external electronic device control latency due to failure of transmission according to various embodiments.

FIG. 10A is a flowchart 1000a illustrating a method in which an electronic device 101 and/or an external electronic device 205 control latency due to failure of transmission according to various embodiments.

According to various embodiments, the electronic device 101 or the external electronic device 205 may determine periods for transmitting and/or receiving data frames in operation 1010a. For example, the electronic device 101 or the external electronic device 205 may determine at least one parameter of the periods (e.g., TWT service periods) for transmitting and/or receiving data frames on the basis of a first data amount, a second data amount, and a network bandwidth, thereby determining the periods in operation 1010a.

According to various embodiments, the electronic device 101 or the external electronic device 205 may transmit and/or receive the data frames according to the determined periods in operation 1030a. For example, the electronic device 101 or the external electronic device 205 may transmit and/or receive at least one data frame during a first period among the determined periods.

According to various embodiments, in operation 1050a, the electronic device 101 or the external electronic device 205 may identify the existence of missing frames among the at least one frame transmitted and/or received during the first period. For example, the electronic device 101 or the external electronic device 205 may transmit at least one data frame to the counterpart device during the first period, and, if an ACK message (e.g., the ACK message 519 or the ACK message 525 in FIG. 5) is not received from the counterpart device, may determine at least one transmitted data frame to be a missing frame. As another example, in the case where the electronic device 101 or the external electronic device 205 failed to transmit a data frame to the counterpart device, the electronic device 101 or the external electronic device 205 may determine the data frame that failed to be transmitted to be a missing frame.

According to various embodiments, if there is a missing frame, in operation 1070a, the electronic device 101 or the external electronic device 205 may transmit and/or receive the missing frame during a second period, which is different from the determined periods. For example, the electronic device 101 or the external electronic device 205 may further determine a period for transmitting and/or receiving the data frame in order to retransmit the missing frame. The electronic device 101 or the external electronic device 205 may transmit, to the counterpart device, a message (e.g., the TWT information frame) including information indicating the starting time of the next period of the first period for transmitting and/or receiving the data frame, thereby determining the second period (e.g., the added service period). For example, the second period may be different from the periods determined in operation 1010a, and may be a period that starts prior to the starting time of the next period of the first period, among the determined periods. The electronic device 101 or the external electronic device 205 may transmit and/or receive the missing frame according to the determined second period.

Figure 10B:
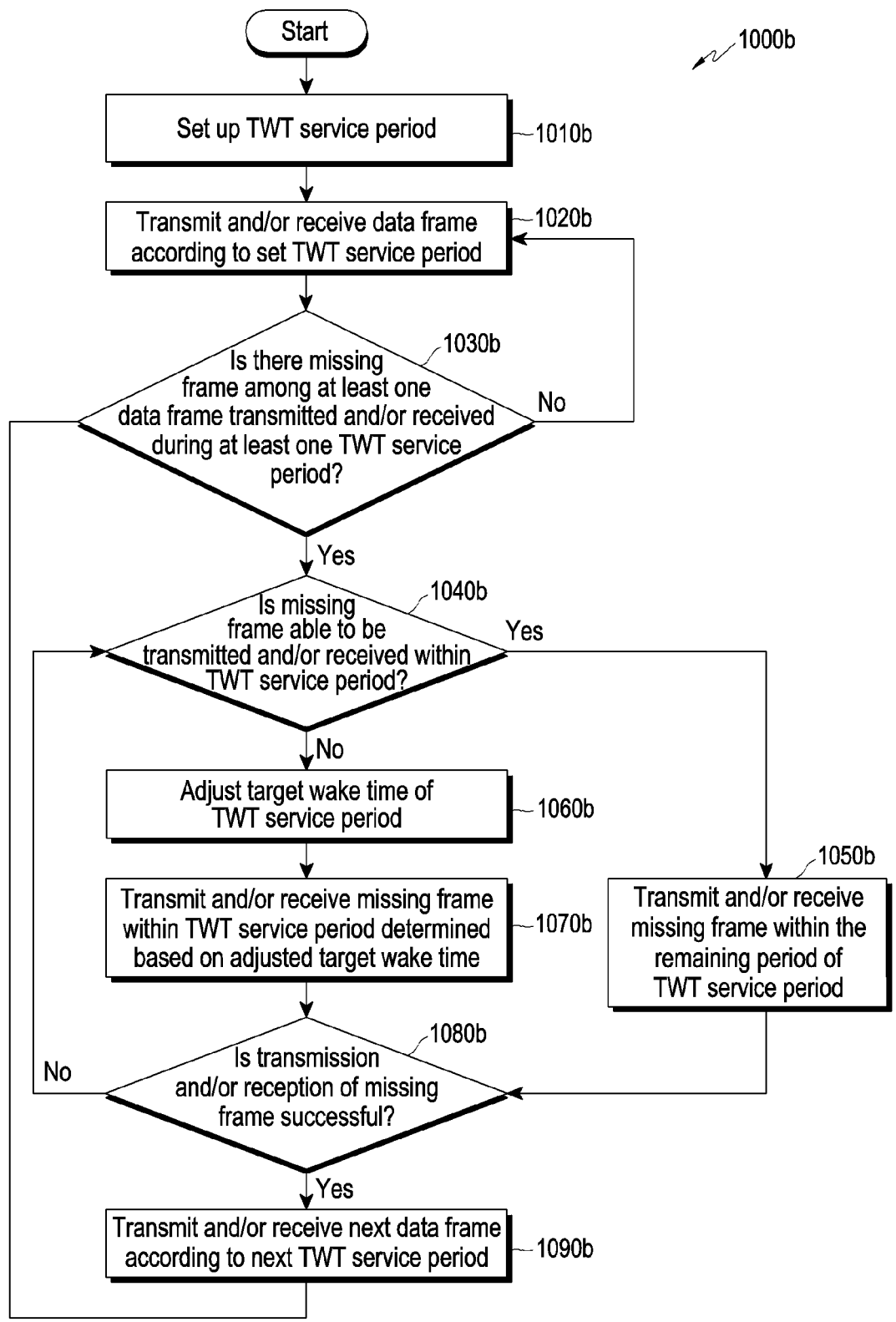
FIG. 10B is a flowchart illustrating a method in which an electronic device and/or an external electronic device control latency due to failure of transmission according to various embodiments.

FIG. 10B is a flowchart 1000b illustrating a method in which an electronic device 101 and/or an external electronic device 205 control latency due to failure of transmission according to various embodiments.

According to various embodiments, the electronic device 101 or the external electronic device 205 may set up a TWT service period in operation 1010b. According to various embodiments, the electronic device 101 or the external electronic device 205 may determine at least one parameter of the TWT service period. For example, the electronic device 101 or the external electronic device 205 may determine the duration of the TWT service period (e.g., the TWT wake duration) on the basis of a first data amount, a second data amount, and a network bandwidth. For example, the electronic device 101 or the external electronic device 205 may determine the interval of the TWT service period (e.g., the TWT wake interval) on the basis of a refresh rate. For example, the electronic device 101 or the external electronic device 205 may determine the time at which the TWT service period starts (e.g., the target wake time) on the basis of a result of monitoring the wireless channel. According to various embodiments, the electronic device 101 or the external electronic device 205 may transmit at least one determined parameter to the counterpart device. For example, the electronic device 101 may transmit, to the external electronic device 205, a response message (e.g., the TWT response frame 503 in FIG. 5) including information on the at least one determined parameter. For example, the external electronic device 205 may transmit, to the electronic device 101, a request message (e.g., the TWT request frame 501 in FIG. 5) including information on at least one determined parameter and then receive, from the electronic device 101, a response message (e.g., the TWT response frame 503 in FIG. 5) indicating approval or rejection of at least one determined parameter.

According to various embodiments, the electronic device 101 or the external electronic device 205 may transmit and/or receive a data frame according to the set TWT service period in operation 1020b.

According to various embodiments, in operation 1030b, the electronic device 101 or the external electronic device 205 may identify whether or not there is a missing frame among at least one data frame transmitted and/or received during at least one TWT service period. For example, the electronic device 101 or the external electronic device 205 may transmit the data frame to the counterpart device every TWT service period and receive an ACK message (e.g., the ACK message 519 or the ACK message 525 in FIG. 5) from the counterpart device. The electronic device 101 or the external electronic device 205 may identify whether or not there is a missing frame among the transmitted data frames on the basis of the ACK message received from the counterpart device. As another example, if the electronic device 101 or the external electronic device 205 fails to transmit a data frame to the counterpart device, the electronic device 101 or the external electronic device 205 may determine the data frame that fails to be transmitted to be a missing frame. According to various embodiments, if it is identified that there is no missing frame among the at least one data frame transmitted and/or received during at least one TWT service period, the electronic device 101 or the external electronic device 205 may reperform operation 1020b, thereby transmitting and/or receiving a corresponding next data frame during the next TWT service period.

According to various embodiments, if it is identified that there is a missing frame among the at least one data frame transmitted and/or received during at least one TWT service period, the electronic device 101 or the external electronic device 205 may identify whether or not the missing frame is able to be transmitted and/or received within the TWT service period in operation 1040b. For example, the electronic device 101 or the external electronic device 205 may identify the time required to transmit the identified missing frame and identify whether or not the missing frame is able to be retransmitted within the remaining period of the TWT service period.

According to various embodiments, if it is identified that the missing frame is able to be transmitted and/or received within the TWT service period, the electronic device 101 or the external electronic device 205 may transmit and/or receive the missing frame within the remaining period of the TWT service period in operation 1050b.

According to various embodiments, if it is identified that the missing frame is unable to be transmitted and/or received within the TWT service period, the electronic device 101 or the external electronic device 205 may adjust the target wake time of the TWT service period in operation 1060b. For example, the electronic device 101 or the external electronic device 205 may transmit, to the counterpart device, a message (e.g., the TWT information frame) including information indicating the starting time of the next TWT service period (e.g., the added service period) in order to retransmit the missing frame of the transmitted data frame.

According to various embodiments, the electronic device 101 or the external electronic device 205 may transmit and/or receive the missing frame within the TWT service period (e.g., the added service period) determined based on the adjusted target wake time in operation 1070b.

According to various embodiments, in operation 1080b, the electronic device 101 or the external electronic device 205 may identify whether or not transmission and/or reception of the missing frame is successful as a result of operation 1050b or operation 1070b. For example, the electronic device 101 or the external electronic device 205 may receive an ACK message indicating reception of the missing frame from the counterpart device after transmitting the missing frame within the remaining period of the TWT service period in operation 1050b. For example, the electronic device 101 or the external electronic device 205 may receive an ACK message (e.g., the ACK message 913 in FIG. 9) indicating reception of the missing frame from the counterpart device after transmitting the missing frame during the TWT service period determined based on the target wake time adjusted in operation 1070b. The electronic device 101 or the external electronic device 205 may identify whether or not the counterpart device has received all the missing frames based on the received ACK message. According to various embodiments, if it is identified that transmission and/or reception of the missing frame is not successful, the electronic device 101 or the external electronic device 205 may reperform operation 1040b, thereby identifying whether or not the missing frame is able to be transmitted within the TWT service period (e.g., within the remaining period of the corresponding TWT service period).

According to various embodiments, if it is identified that transmission and/or reception of the missing frame is successful, the electronic device 101 or the external electronic device 205, in operation 1090b, may transmit and/or receive the next data frame according to the next TWT service period. For example, the electronic device 101 or the external electronic device 205 may transmit, to the counterpart device, a message (e.g., the TWT information frame) including information indicating the starting time of the next TWT service period in order to re-adjust the target wake time of the next TWT service period. The electronic device 101 or the external electronic device 205 may transmit and/or receive a corresponding next TWT data frame during the initially scheduled next TWT service period based on the re-adjusted target wake time. According to various embodiments, the electronic device 101 or the external electronic device 205 may reperform operation 1040b after operation 1090b.

Figure 10C:
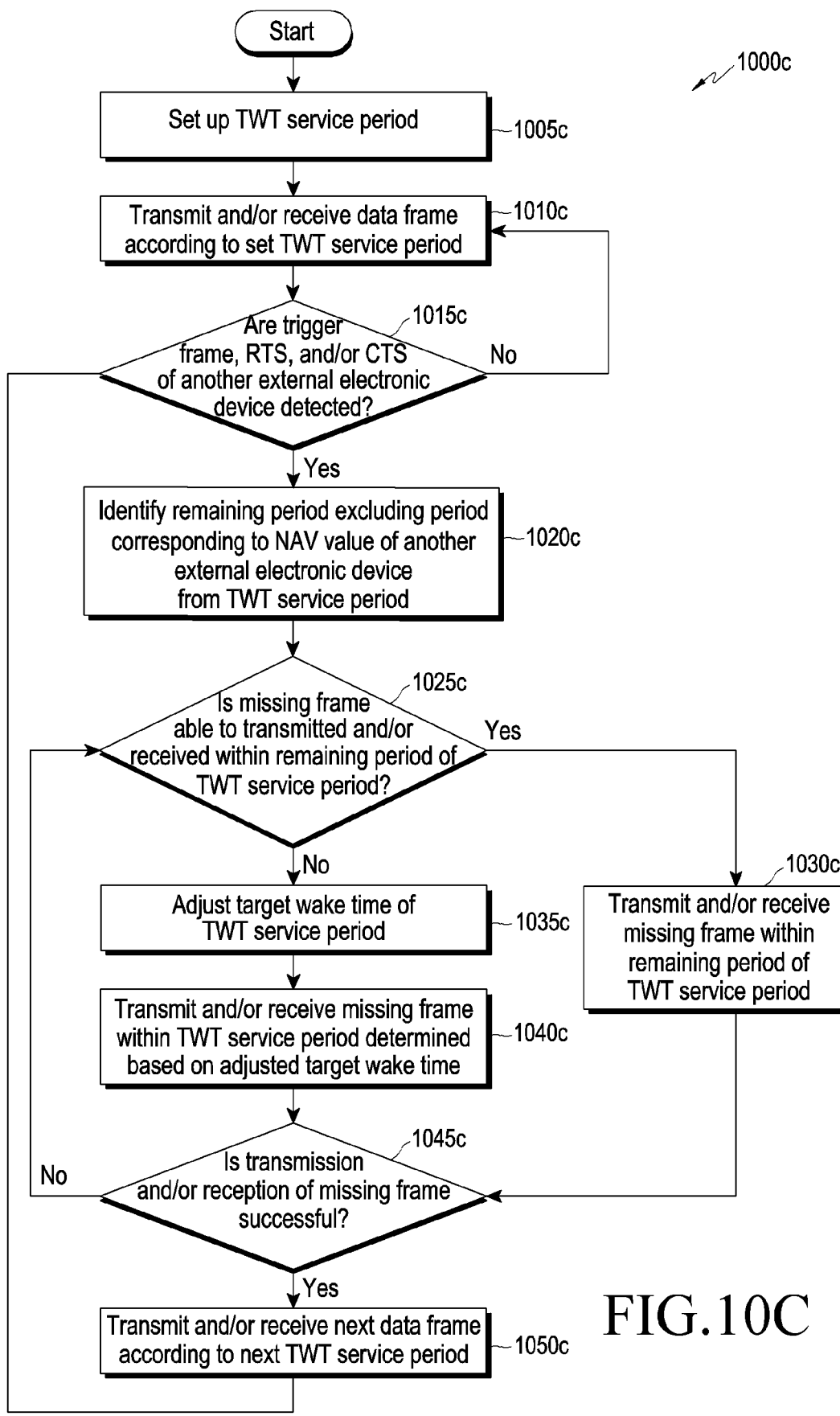
FIG. 10C is a flowchart illustrating a method in which an electronic device and/or an external electronic device control latency due to failure of transmission according to various embodiments.

FIG. 10C is a flowchart 1000b illustrating a method in which an electronic device 101 and/or an external electronic device 205 control latency due to failure of transmission according to various embodiments. A duplicate of a description that has been made in FIG. 10A or 10B will be omitted below.

According to various embodiments, the electronic device 101 or the external electronic device 205 may set up a TWT service period in operation 1005c. According to various embodiments, the electronic device 101 or the external electronic device 205 may determine at least one parameter of the TWT service period.

According to various embodiments, the electronic device 101 or the external electronic device 205 may transmit and/or receive a data frame according to the set TWT service period in operation 1010c.

According to various embodiments, in operation 1015c, the electronic device 101 or the external electronic device 205 may identify whether or not a trigger frame, RTS (ready-to-send or request-to-send), and/or CTS (clear-to-send) of another external electronic device are detected. For example, the RTS may include information indicating that a transmitting device is to transmit data to a receiving device. For example, the CTS may include information transmitted from a receiving device to a transmitting device so as to indicate that the receiving device is in the state capable of receiving data. According to various embodiments, the detected trigger frame, RTS, or CTS may include information indicating a network allocation vector (NAV) value. For example, the NAV value may indicate information on the time for which the wireless channel is occupied by the first external electronic device that transmits the trigger frame, the RTS (ready-to-send or request-to-send), or the CTS (clear-to-send) and the second external electronic device that transmits and/or receives data to and/or from the first external electronic device, and may provide a function of restricting access of devices, which are different from the first and second external electronic devices, to a wireless medium until the NAV value becomes 0. According to various embodiments, if the trigger frame, RTS, and/or CTS of another external electronic device are not detected, the electronic device 101 or the external electronic device 205 may reperform operation 1010c, thereby transmitting and/or receiving a corresponding next data frame during the next TWT service period.

According to various embodiments, if it is identified that the trigger frame, RTS, and/or CTS of another external electronic device are detected, the electronic device 101 or the external electronic device 205, in operation 1020c, may identify the remaining period excluding the period corresponding to the NAV value of another external electronic device from the TWT service period. For example, the electronic device 101 or the external electronic device 205 may identify the time during which access of the electronic device 101 and the external electronic device 205 to the wireless medium is restricted in the TWT service period in which the trigger frame, RTS, and/or CTS of another external electronic device are detected on the basis of the NAV value, and may identify the time value obtained by subtracting the time during which access to the wireless medium is restricted from the duration of the TWT service period.

According to various embodiments, in operation 1025c, the electronic device 101 or the external electronic device 205 may identify whether or not the missing frame is able to transmitted and/or receive within the remaining period of the TWT service period. For example, the electronic device 101 or the external electronic device 205 may identify the time value obtained by subtracting the time during which access to the wireless medium is restricted from the duration of the TWT service period and identify whether or not the missing frame is able to be transmitted and/or received during the time corresponding to the time value. For example, the electronic device 101 or the external electronic device 205 may identify the time for transmitting and/or receiving the missing data from the value obtained by dividing the amount of missing data to be transmitted and/or received by a network bandwidth and, if the time value, obtained by subtracting the time during which access to the wireless medium is restricted from the duration of the TWT service period, is greater than the time for transmitting and/or receiving the missing data, determine that the missing frame is able to be transmitted and/or received.

According to various embodiments, if it is identified that the missing frame is able to be transmitted and/or received within the remaining period of the TWT service period, in operation 1030c, the electronic device 101 or the external electronic device 205 may transmit and/or receive the missing frame within the remaining period of the TWT service period.

According to various embodiments, if it is identified that the missing frame is unable to be transmitted and/or received within the remaining period of the TWT service period, the electronic device 101 or the external electronic device 205 may adjust the target wake time of the TWT service period in operation 1035c. For example, the electronic device 101 or the external electronic device 205 may transmit, to the counterpart device, a message (e.g., the TWT information frame) including information indicating the starting time of the next TWT service period (e.g., the added service period) in order to retransmit the missing frame of the transmitted data frame.

According to various embodiments, the electronic device 101 or the external electronic device 205 may transmit and/or receive the missing frame during the TWT service period (e.g., the added service period) determined based on the adjusted target wake time in operation 1040c.

According to various embodiments, in operation 1045c, the electronic device 101 or the external electronic device 205 may identify whether or not transmission and/or reception of the missing frame is successful as a result of performing operation 1030c or operation 1040c. For example, the electronic device 101 or the external electronic device 205 may receive an ACK message indicating reception of the missing frame from the counterpart device. The electronic device 101 or the external electronic device 205 may identify whether or not the counterpart device has received the entire missing frame on the basis of the received ACK message. According to various embodiments, if it is identified that transmission and/or reception of the missing frame is not successful, the electronic device 101 or the external electronic device 205 may perform operation 1025c again.

According to various embodiments, if it is identified that transmission and/or reception of the missing frame is successful, the electronic device 101 or the external electronic device 205, in operation 1050c, may transmit and/or receive the next data frame corresponding to the next TWT service period (e.g., the next TWT service period that is initially scheduled). According to various embodiments, the electronic device 101 or the external electronic device 205 may reperform operation 1015c after operation 1050c.

Figure 10D:
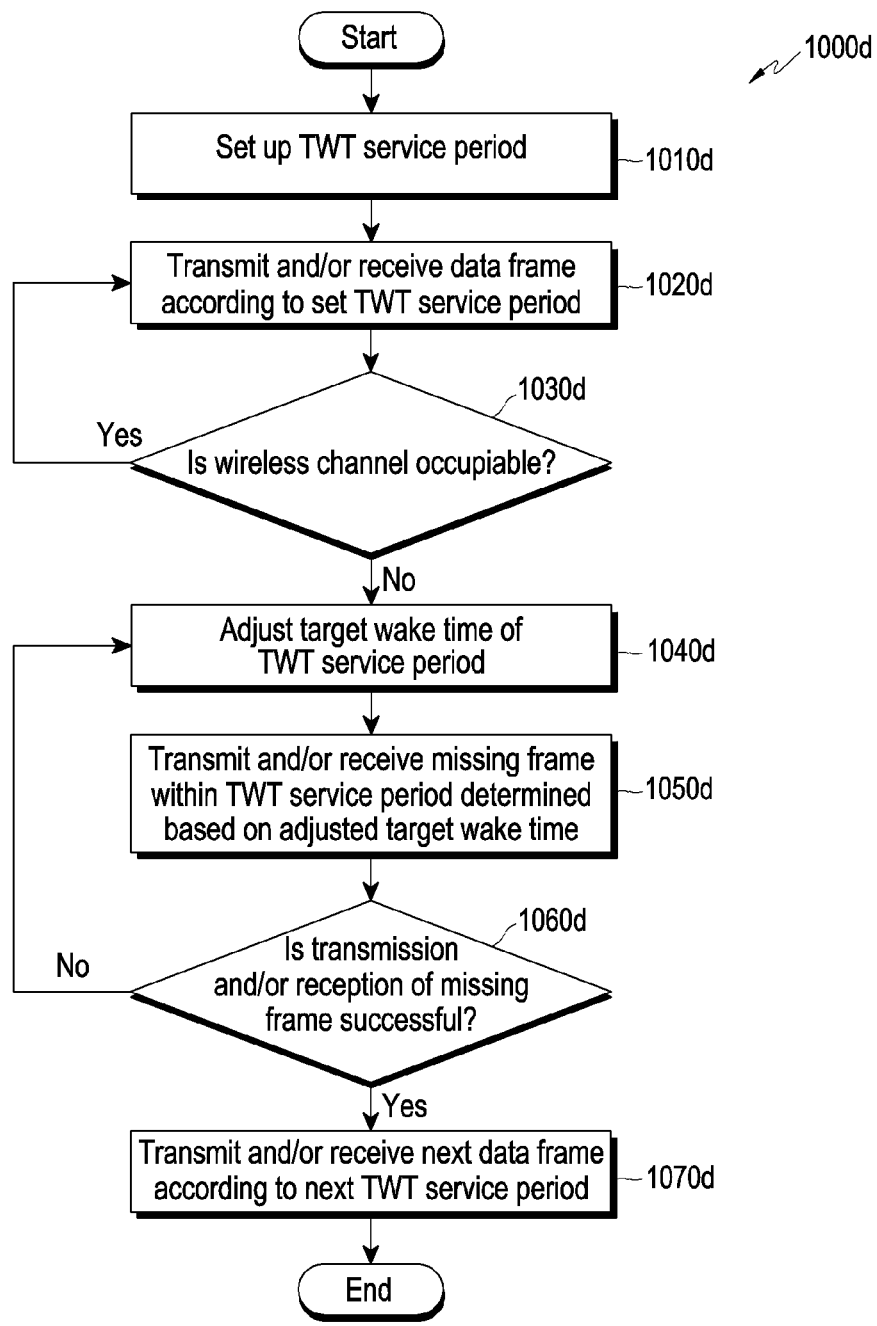
FIG. 10D is a flowchart illustrating a method in which an electronic device and/or an external electronic device control latency due to failure of transmission according to various embodiments.

FIG. 10D is a flowchart 1000c illustrating a method in which an electronic device 101 and/or an external electronic device 205 control latency due to failure of transmission according to various embodiments. A duplicate of a description that has been made with reference to FIG. 10A, 10B, or 10C will be omitted below.

According to various embodiments, the electronic device 101 or the external electronic device 205 may set up a TWT service period in operation 1010d. According to various embodiments, the electronic device 101 or the external electronic device 205 may determine at least one parameter of the TWT service period.

According to various embodiments, the electronic device 101 or the external electronic device 205 may transmit and/or receive a data frame according to the set TWT service period in operation 1020d.

According to various embodiments, the electronic device 101 or the external electronic device 205 may identify whether or not the wireless channel is capable of being occupied in operation 1030d. According to various embodiments, the electronic device 101 or the external electronic device 205 may perform clear channel assessment (CCA), thereby identifying the wireless channel section occupied by another external electronic device. According to various embodiments, if it is identified that the wireless channel is capable of being occupied to transmit the data frame during the set TWT service period as a result of performing CCA, operation 1020d may be reperformed so that the corresponding data frame may be transmitted and/or received during the TWT service period. According to various embodiments, if the corresponding data frame is unable to be transmitted during the set TWT service period due to occupation of the wireless channel by another external electronic device as a result of performing CCA, occupation of the wireless channel may be identified to be impossible.

According to various embodiments, if it is identified that occupation of the wireless channel is impossible, the electronic device 101 or the external electronic device 205 may adjust the target wake time of the TWT service period in operation 1040d. For example, the electronic device 101 or the external electronic device 205 may transmit, to the counterpart device, a message (e.g., the TWT information frame) including information indicating the starting time of the next TWT service period (e.g., the added service period) in order to retransmit the missing frame of the transmitted data frame.

According to various embodiments, the electronic device 101 or the external electronic device 205 may transmit and/or receive the missing frame during the TWT service period (e.g., the added service period) determined based on the adjusted target wake time in operation 1050d.

According to various embodiments, the electronic device 101 or the external electronic device 205 may identify whether or not transmission and/or reception of the missing frame is successful in operation 1060d. For example, the electronic device 101 or the external electronic device 205 may receive an ACK message indicating reception of the missing frame from the counterpart device. The electronic device 101 or the external electronic device 205 may identify whether or not the counterpart device has received the entire missing frame on the basis of the received ACK message. According to various embodiments, if it is identified that transmission and/or reception of the missing frame is not successful, the electronic device 101 or the external electronic device 205 may reperform operation 1040d.

According to various embodiments, if it is identified that transmission and/or reception of the missing frame is successful, the electronic device 101 or the external electronic device 205 may transmit and/or receive the next data frame according to the next TWT service period (e.g., the next TWT service period that is initially scheduled) in operation 1070d.

Figure 11A:
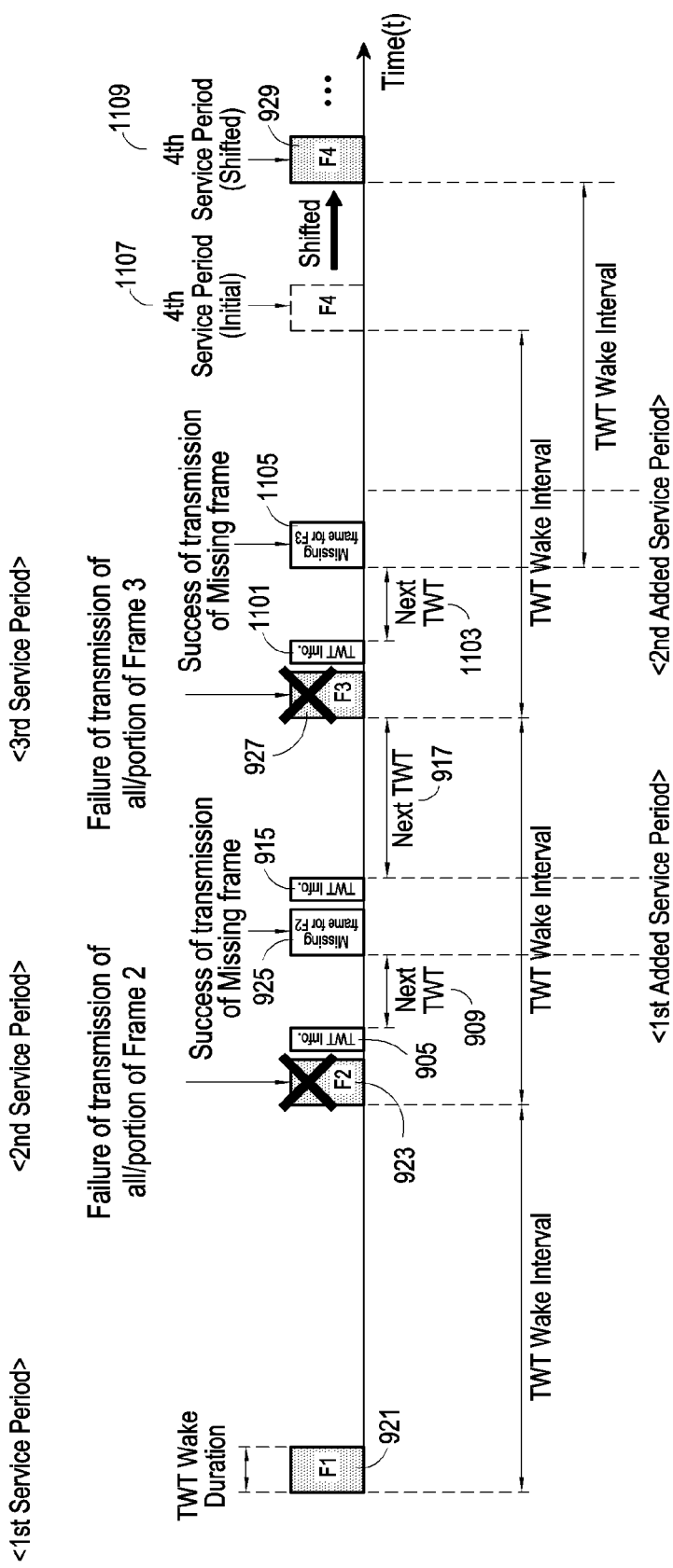
FIG. 11A is a diagram illustrating a method in which an electronic device and/or an external electronic device control latency due to failure of transmission by shifting a TWT service period according to various embodiments.

FIG. 11A is a diagram illustrating a method in which an electronic device 101 and/or an external electronic device 205 control latency due to failure of transmission by shifting a TWT service period according to various embodiments. Hereinafter, a description will be made with reference to FIGS. 9A and 9B as well. A duplicate of a description that has been made in FIG. 9A or 9B will be omitted below.

Referring to FIG. 9B as well, if at least a portion of the data frame (e.g., F3 927) fails to be transmitted within a service period (e.g., a $3^{rd}$ service period) or if at least a portion of the transmitted data frame (e.g., F3 927) is not received by the counterpart device due to issues such as wireless channel interference, congestion, and/or low signal quality (e.g., failure of transmission of all/some of the data frame (e.g., F3 927)), the electronic device 101 or the external electronic device 205 may transmit, to the counterpart device, a message (e.g., a TWT information frame 1101) including information indicating the next TWT 1103. Thereafter, the electronic device 101 or the external electronic device 205 may transmit, to the counterpart device, a missing frame 1105 of the data frame (e.g., F3 927) during a new service period (e.g., a $2^{nd}$ added service period) determined on the basis of the next TWT 1103.

According to various embodiments, the electronic device 101 or the external electronic device 205 may identify that failure of transmission of all/some of the data frame continuously occurs during the consecutive TWT service periods (e.g., a $2^{nd}$ service period and a $3^{rd}$ service period). As another example, the electronic device 101 or the external electronic device 205 may identify that the number of TWT service periods, in which failure of transmission of all/a portion of the data frame occurred, is greater than or equal to a threshold number, among a predetermined number of consecutive TWT service periods.

According to various embodiments, if it is identified that failure of transmission of all/a portion of the data frame continuously occurs, the electronic device 101 or the external electronic device 205 may maintain the target wake time of the next TWT service period without re-adjusting the same. For example, referring to FIG. 9A as well, after identifying that the entire missing frame 1105 is received by the counterpart device, the electronic device 101 or the external electronic device 205 may not transmit, to the counterpart device, a message (e.g., the TWT information frame 915 in FIG. 9A) for re-adjusting the target wake time of the next TWT service period, thereby maintaining the target wake time of the next TWT service period. In this case, the next TWT service period (e.g., a $4^{th}$ service period) may start after the TWT wake interval, which is determined at the time of initial setup, from the new TWT service period (e.g., the $2^{nd}$ service period) in which the missing frame 1105 is transmitted. Referring to FIGS. 9B and 11A, if the message (e.g., the TWT information frame 915 in FIG. 9A) is transmitted (in the case shown in FIG. 9A), the next TWT service period may be determined to be the TWT service period (e.g., a $4^{th}$ service period (initial)) 1107 scheduled at the time of initial setup, whereas if the message (e.g., the TWT information frame 915 in FIG. 9A) is not transmitted (in the case shown in FIG. 11A), the next TWT service period may be determined to be the TWT service period (e.g., a $4^{th}$ service period (shifted)) 1109 shifted from the TWT service period (e.g., the $4^{th}$ service period (initial)) 1107 scheduled at the time of initial setup.

According to various embodiments, the electronic device 101 and the external electronic device 205 may transmit and/or receive a data frame (e.g., F4 929) during the shifted TWT service period (e.g., the $4^{th}$ service period (shifted)) 1109.

According to the method described above, in the case where it is identified that the missing frame frequently occurs after the initial TWT setup, the electronic device 101 and/or the external electronic device 205 may determine that the missing frame may frequently occur afterwards if transmission and/or the reception of the data frame continues based on the TWT service period according to the initial TWT setup. The electronic device 101 and/or the external electronic device 205 may perform rescheduling based on the new TWT service period in which the last transmission and/or reception of the missing frame was successful, instead of the TWT service period scheduled at the time of initial setup, thereby reducing the possibility of the missing frame occurring and thus minimizing the latency due to the occurrence of the missing frame.

Figure 11B:
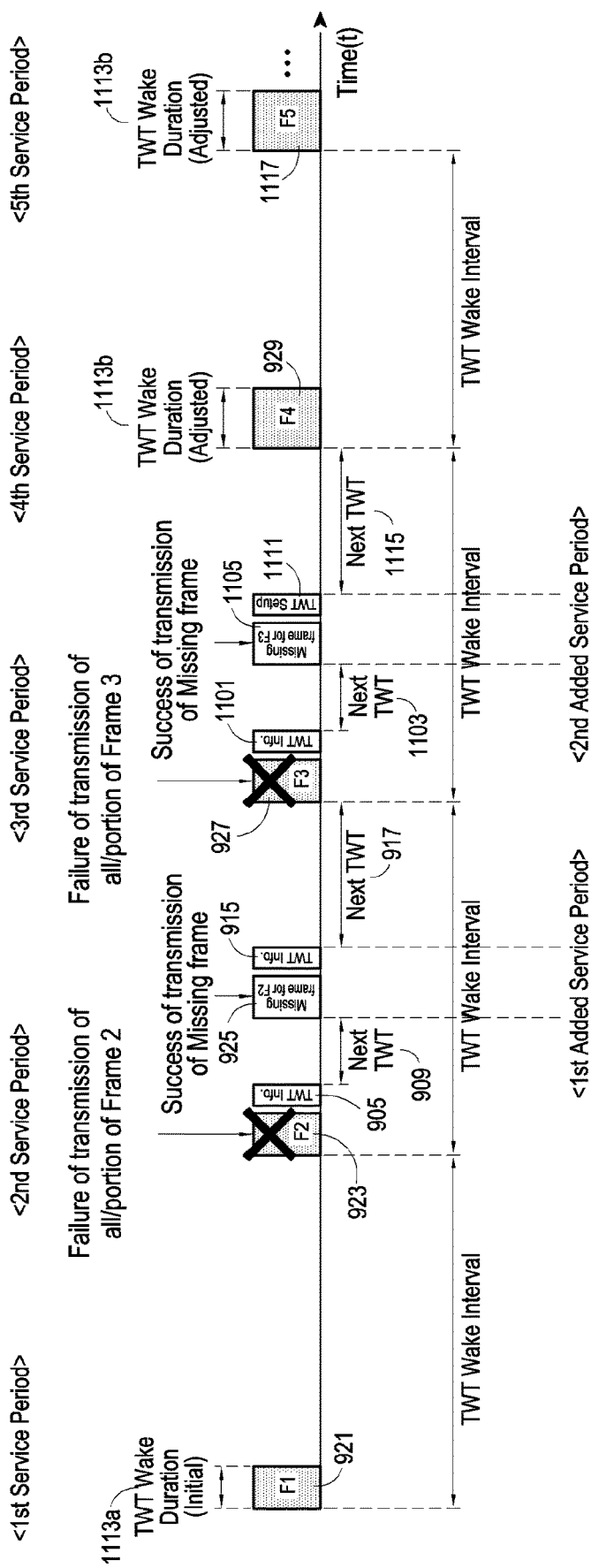
FIG. 11B is a diagram illustrating a method in which an electronic device and/or an external electronic device control latency due to failure of transmission by adjusting a TWT wake duration according to various embodiments.

FIG. 11B is a diagram illustrating a method in which an electronic device 101 and/or an external electronic device 205 control latency due to failure of transmission by adjusting a TWT wake duration according to various embodiments. Hereinafter, a description will be made with reference to FIGS. 9A, 9B, and 11A as well. A duplicate of a description that has been made in FIG. 9A, 9B, or 11A will be omitted below.

Referring to FIG. 11A as well, according to various embodiments, failure of transmission of all/a portion of the data frame may occur continuously in consecutive TWT service periods (e.g., the $2^{nd}$ service period and the $3^{rd}$ service period).

According to various embodiments, if it is identified that failure of transmission of all/a portion of the data frame continuously occurs in the consecutive TWT service periods (e.g., the $2^{nd}$ service period and the $3^{rd}$ service period), the electronic device 101 or the external electronic device 205 may transmit, to the counterpart device, a message (e.g., a TWT request frame and/or a TWT response frame) for TWT reset (e.g., a TWT setup 1111). For example, the message (e.g., the TWT request frame and/or the TWT response frame) may include information on at least one parameter (e.g., a TWT wake duration, a TWT wake interval, and a target wake time) of the TWT service period. According to various embodiments, the electronic device 101 or the external electronic device 205 may transmit a message (e.g., the TWT request frame and/or TWT response frame) including information on a TWT wake duration 1113b that is different from the TWT wake duration determined at the time of initial setup.

According to various embodiments, the electronic device 101 or the external electronic device 205 may determine the TWT wake duration 1113b, which is different from the TWT wake duration determined at the time of initial setup, on the basis of the additional time required for transmission of the data frame that failed to be transmitted during the previous TWT service period. For example, in the case where the TWT wake duration determined at the time of initial setup is 2 ms, if a time of 4 ms is taken for transmission of the data frame that failed to be transmitted during the previous TWT service period due to channel congestion and retransmission of the missing frame, the TWT wake duration 1113b may be determined to be 4 ms taken for transmission of the data frame that failed to be transmitted during the previous TWT service period and retransmission of the missing frame.

According to various embodiments, the message (e.g., the TWT request frame and/or the TWT response frame) including information on the different TWT wake duration 1113b may be received by the counterpart device, and the TWT service period of the electronic device 101 and the external electronic device 205 may be rescheduled. For example, referring to FIG. 11B, the TWT service period (e.g., a 4th service period or a $5^{th}$ service period) of the electronic device 101 and the external electronic device 205 may have the TWT wake duration 1113b that is changed from the initially configured TWT wake duration 1113a.

According to various embodiments, the rescheduled TWT service period (e.g., the $4^{th}$ service period) may start at the starting time of the TWT service period scheduled at the time of initial setup (e.g., at the time after the lapse of the target wake time 1115 determined at the time of initial setup from the new service period (e.g., the $2^{nd}$ added service period)). According to various embodiments, the electronic device 101 and the external electronic device 205 may transmit and/or receiving a corresponding next data frame (e.g., F4 929 or F5 1117) during each TWT service period (e.g., the $4^{th}$ service period or the $5^{th}$ service period) having the reset TWT wake duration.

According to various embodiments, the electronic device 101 or the external electronic device 205 may change the TWT wake duration back to the TWT wake duration 1113a of the initial setup, if the channel congestion is reduced (e.g., a reduction in the frequency of the occurrence of the missing frames) or if the data frame is able to be transmitted within the TWT wake duration determined at the time of initial setup, after the TWT reset.

Figure 11C:
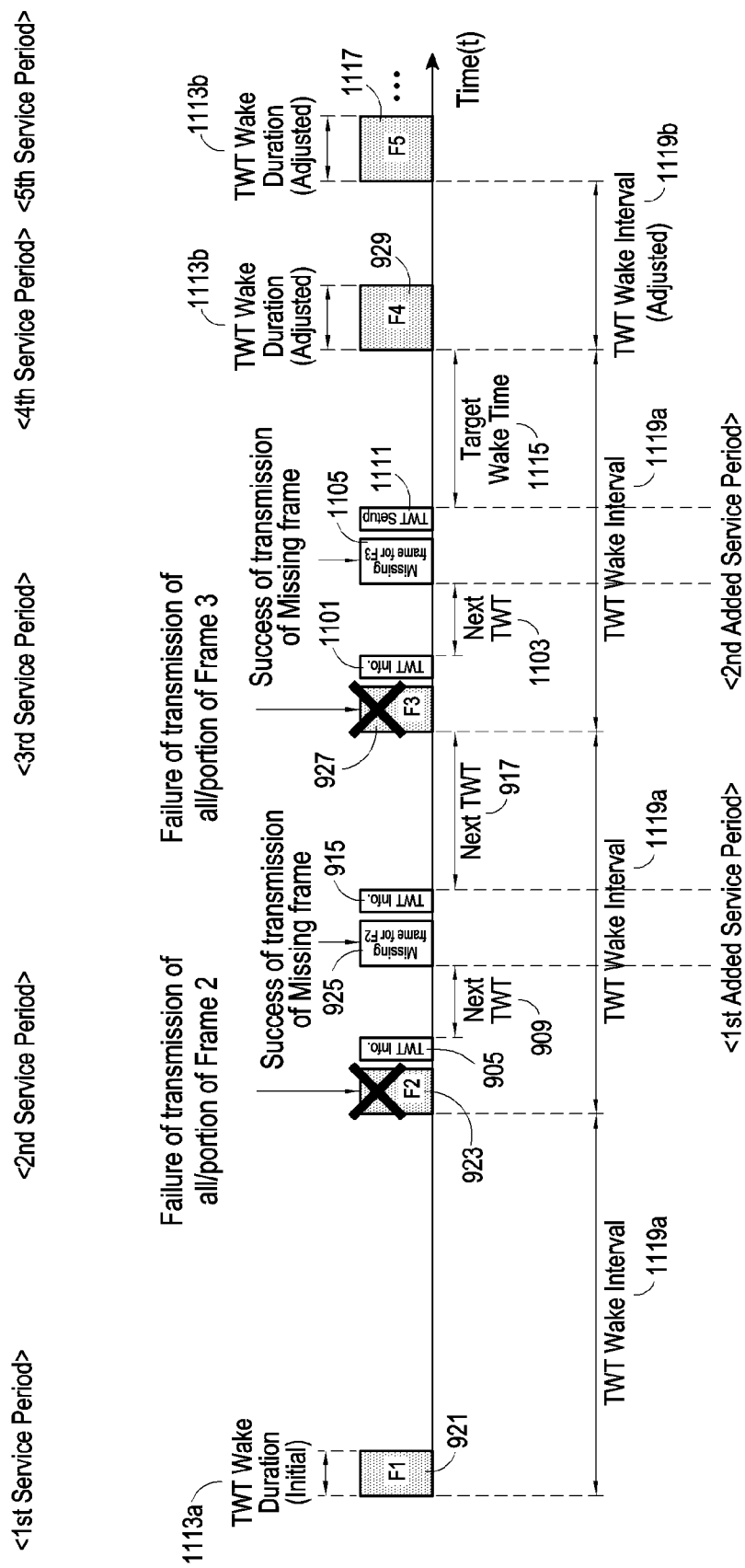
FIG. 11C is a diagram illustrating a method in which an electronic device and/or an external electronic device control latency due to failure of transmission by adjusting a TWT wake duration and a TWT wake interval according to various embodiments.

FIG. 11C is a diagram illustrating a method in which an electronic device 101 and/or an external electronic device 205 control latency due to failure of transmission by adjusting a TWT wake duration and a TWT wake interval according to various embodiments. Hereinafter, a description will be made with reference to FIGS. 11A and 11B as well. A duplicate of a description that has been made in FIG. 11A or 11B will be omitted below.

Referring to FIG. 11B as well, according to various embodiments, if it is identified that failure of transmission of all/a portion of the data frame continuously occurs in consecutive TWT service periods (e.g., the $2^{nd}$ service period and the $3^{rd}$ service period), the electronic device 101 or the external electronic device 205 may transmit, to the counterpart device, a message for TWT reset (e.g., the TWT request frame and/or the TWT response frame). For example, the message (e.g., the TWT request frame and/or the TWT response frame) may include information on at least one parameter (e.g., a TWT wake duration, a TWT wake interval, and a target wake time) of the TWT service period. According to various embodiments, the electronic device 101 or the external electronic device 205 may transmit a message (e.g., the TWT request frame and/or the TWT response frame) including information on a TWT wake duration 1113b, which is different from the TWT wake duration determined at the time of initial setup, and a TWT wake interval 1119b, which is different from the TWT wake interval determined at the time of initial setup.

According to various embodiments, the electronic device 101 or the external electronic device 205 may determine the TWT wake duration 1113b and the TWT wake interval 1119b on the basis of the additional time required for transmission of the data frame that failed to be transmitted during the previous TWT service period. For example, in the case where the TWT wake duration determined at the time of initial setup is 2 ms, if a time of 4 ms is taken for transmission of the data frame that failed to be transmitted during the previous TWT service period due to the channel congestion and retransmission of the missing frame, the TWT wake interval 1119b may be determined to be a value of ½ times the TWT wake interval 1119a determined at the time of initial setup.

According to various embodiments, the message (e.g., the TWT request frame and/or the TWT response frame) may be received by the counterpart device, and the TWT service period of the electronic device 101 and the external electronic device 205 may be rescheduled. For example, referring to FIG. 11B as well, the TWT service period (e.g., the $4^{th}$ service period or the $5^{th}$ service period) of the electronic device 101 and the external electronic device 205 may have the TWT wake duration 1113b changed from the TWT wake duration 1113a of the initial setup and the TWT wake interval 1119b changed from the TWT wake interval 1119a of the initial setup. According to various embodiments, the rescheduled TWT service period (e.g., the $4^{th}$ service period) may start at the starting time of the TWT service period scheduled at the time of initial setup (e.g., at the time after the lapse of the target wake time 1115 determined at the time of initial setup from the new service period (e.g., the $2^{nd}$ added service period)).

According to various embodiments, the electronic device 101 and the external electronic device 205 may transmit and/or receive a corresponding next data frame (e.g., F4 929 or F5 1117) during each TWT service period (e.g., the $4^{th}$ service period or the $5^{th}$ service period) having the reset TWT wake duration and the reset TWT wake interval.

According to various embodiments, if the channel congestion is reduced (e.g., a reduction in the frequency of occurrence of the missing frames) after the TWT reset, the electronic device 101 or the external electronic device 205 may change them back to the initially set TWT wake duration 1113a and/or TWT wake interval 1119a.

Figure 12A:
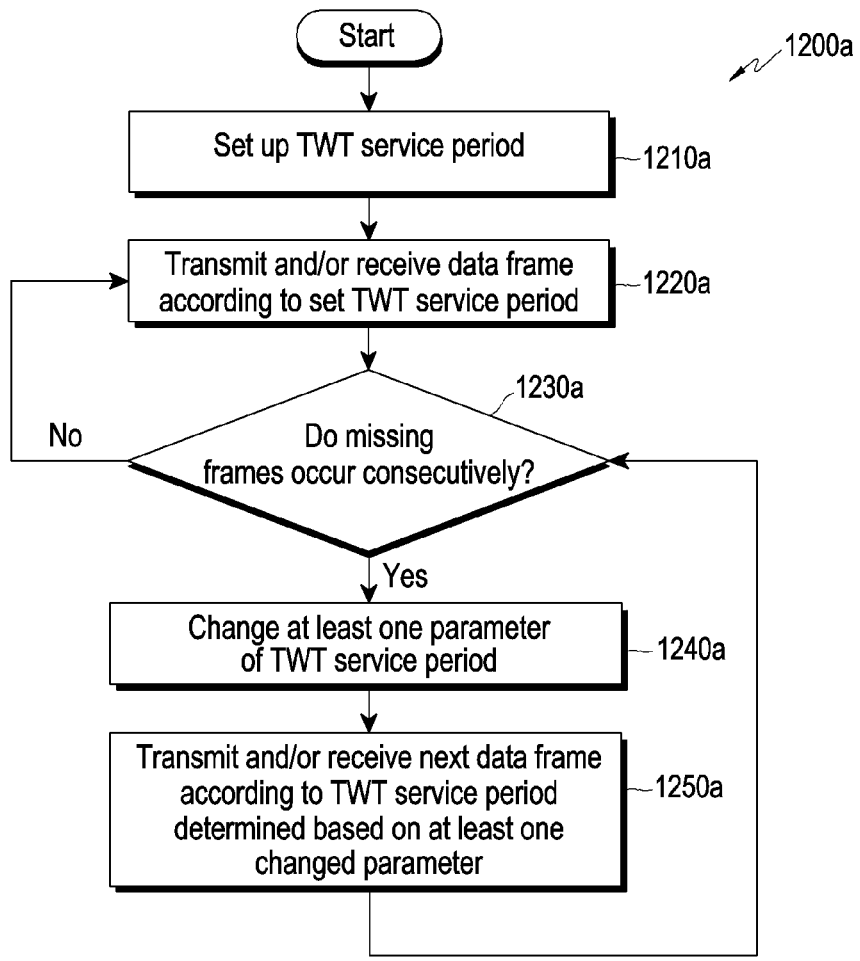
FIG. 12A is a flowchart illustrating a method in which an electronic device and/or an external electronic device 205 control latency due to failure of transmission by rescheduling a TWT service period according to various embodiments.

FIG. 12A is a flowchart 1200a illustrating a method in which an electronic device 101 and/or an external electronic device 205 control latency due to failure of transmission by rescheduling a TWT service period according to various embodiments. Hereinafter, a description will be made with reference to FIG. 11A, 11B, or 11C as well.

According to various embodiments, the electronic device 101 or the external electronic device 205 may set up a TWT service period in operation 1210a. According to various embodiments, the electronic device 101 or the external electronic device 205 may determine one or more parameters of the TWT service period.

According to various embodiments, the electronic device 101 or the external electronic device 205 may transmit and/or receive a data frame according to the set TWT service period in operation 1220a.

According to various embodiments, the electronic device 101 or the external electronic device 205 may identify whether or not missing frames occurs consecutively in operation 1230a. For example, the electronic device 101 or the external electronic device 205 may identify whether or not failure of transmission of all/a portion of the data frame occurs in consecutive TWT service sections. As another example, the electronic device 101 or the external electronic device 205 may identify that the number of TWT service sections in which failure of transmission of all/a portion of the data frame occurs, among a predetermined number of consecutive TWT service sections, is equal to or greater than a threshold number. According to various embodiments, if it is identified that no missing frame consecutively occurs, the electronic device 101 or the external electronic device 205 may reperform operation 1220a, thereby transmitting and/or receiving a corresponding next data frame during the next TWT service period.

According to various embodiments, when it is identified that there are consecutive missing frames, the electronic device 101 or the external electronic device 205 may change at least one parameter of the TWT service period in operation 1240a. For example, the electronic device 101 or the external electronic device 205 may change at least one of a TWT wake duration or a TWT wake interval of the TWT service period, thereby determining (e.g., rescheduling) the TWT service period. The electronic device 101 or the external electronic device 205 may transmit a message (e.g., the TWT request frame and/or the TWT response frame) including information on the changed parameter to the counterpart device. According to various embodiments, the electronic device 101 or the external electronic device 205 may not transmit a message (e.g., the TWT information frame 915 in FIG. 9) for re-adjusting the target wake time of the TWT service period, thereby shifting the next TWT service period. According to various embodiments, the electronic device 101 or the external electronic device 205 may change the target wake time of the TWT service period to the target wake time, which is different from the target wake time determined at the time of initial setup, thereby rescheduling the TWT service period.

According to various embodiments, in operation 1250a, the electronic device 101 or the external electronic device 205 may transmit and/or receive the next data frame according to the TWT service period determined on the basis of at least one changed parameter. According to various embodiments, the electronic device 101 or the external electronic device 205 may reperform operation 1230a after performing operation 1250a.

Figure 12B:
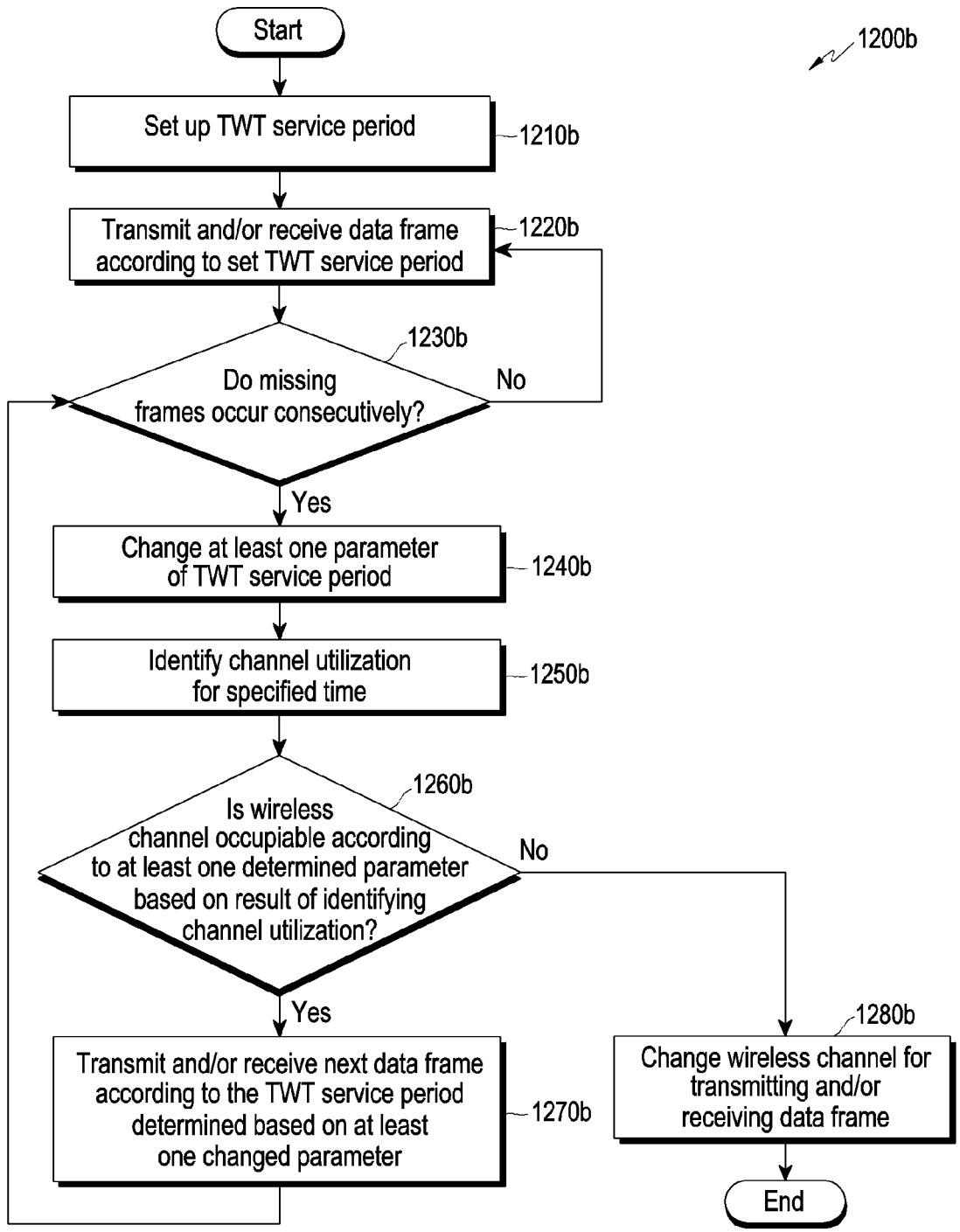
FIG. 12B is a flowchart illustrating a method in which an electronic device and/or an external electronic device control latency due to failure of transmission by changing a wireless channel according to various embodiments.

FIG. 12B is a flowchart 1200b illustrating a method in which an electronic device 101 and/or an external electronic device 205 control latency due to failure of transmission by changing a wireless channel according to various embodiments. Hereinafter, a description will be made with reference to FIG. 12A as well.

According to various embodiments, the electronic device 101 or the external electronic device 205 may set up a TWT service period in operation 1210b. According to various embodiments, the electronic device 101 or the external electronic device 205 may determine one or more parameters of the TWT service period.

According to various embodiments, the electronic device 101 or the external electronic device 205 may transmit and/or receive a data frame according to the set TWT service period in operation 1220b.

According to various embodiments, the electronic device 101 or the external electronic device 205 may identify whether or not missing frames occurs consecutively in operation 1230b. According to various embodiments, if it is identified that no missing frame consecutively occurs, the electronic device 101 or the external electronic device 205 may reperform operation 1220b, thereby transmitting and/or receiving a corresponding next data frame during the next TWT service period.

According to various embodiments, if it is identified that missing frames consecutively occur, the electronic device 101 or the external electronic device 205 may determine at least one parameter of the TWT service period to be changed in operation 1240b. For example, the electronic device 101 or the external electronic device 205 may determine at least one of a TWT wake duration or a TWT wake interval of the TWT service period.

According to various embodiments, the electronic device 101 or the external electronic device 205 may identify channel utilization (CU) for a specified time in operation 1250b. For example, the electronic device 101 or the external electronic device 205 may identify the channel utilization by monitoring the wireless channel for a specified time. For example, the channel utilization may indicate a ratio of the time occupied by another external electronic device to a specified time for a wireless channel.

According to various embodiments, in operation 1260b, the electronic device 101 or the external electronic device 205 may identify whether or not the wireless channel is capable of being occupied according to at least one determined parameter on the basis of a result of identifying the channel utilization. For example, in the case where the TWT wake interval determined in operation 1240b is 16.6 ms, if the channel utilization is identified to be 20%, the electronic device 101 or the external electronic device 205 may identify the channel occupiable time to be 12.28 ms corresponding to 80% of 16.6 ms, which is the TWT wake interval. In the case where the TWT wake duration determined in operation 1240b is 4 ms, since the determined TWT wake duration is less than the channel occupiable time 12.28 ms, the electronic device 101 or the external electronic device 205 may identify that the wireless channel is capable of being occupied according to the determined TWT wake interval and TWT wake duration. In the case where the channel utilization is identified to be 80%, the channel occupiable time is 3.32 ms, which is 20% of 16.6 ms, and is less than 4 ms, which is the TWT wake duration determined in operation 1240b, and in this case, the electronic device 101 or the external electronic device 205 may identify that the wireless channel is not occupiable according to the determined TWT wake interval and TWT wake duration.

According to various embodiments, if it is identified that the wireless channel is capable of being occupied according to at least one determined parameter on the basis of a result of identifying the channel utilization, in operation 1270b, the electronic device 101 or the external electronic device 205 may transmit and/or receive the next data frame according to the TWT service period determined on the basis of at least one changed parameter. According to various embodiments, the electronic device 101 or the external electronic device 205 may reperform operation 1230b after performing operation 1270b.

According to various embodiments, if it is identified that the wireless channel is not occupiable according to at least one determined parameter on the basis of a result of identifying the channel utilization, in operation 1280b, the electronic device 101 or the external electronic device 205 may change the wireless channel for transmitting and/or receiving the data frame. When it is determined to change the wireless channel, the electronic device 101 or the external electronic device 205 may exchange information on the channel to be changed and the time for the changed channel to be applied with the counterpart device through out-of-band (OOB) communication (e.g., Bluetooth low energy (BLE) communication or 2.4 GHz-band WiFi communication). According to various embodiments, the electronic device 101 or the external electronic device 205 may reperform operation 1210b after performing operation 1280b.

Figure 13A:
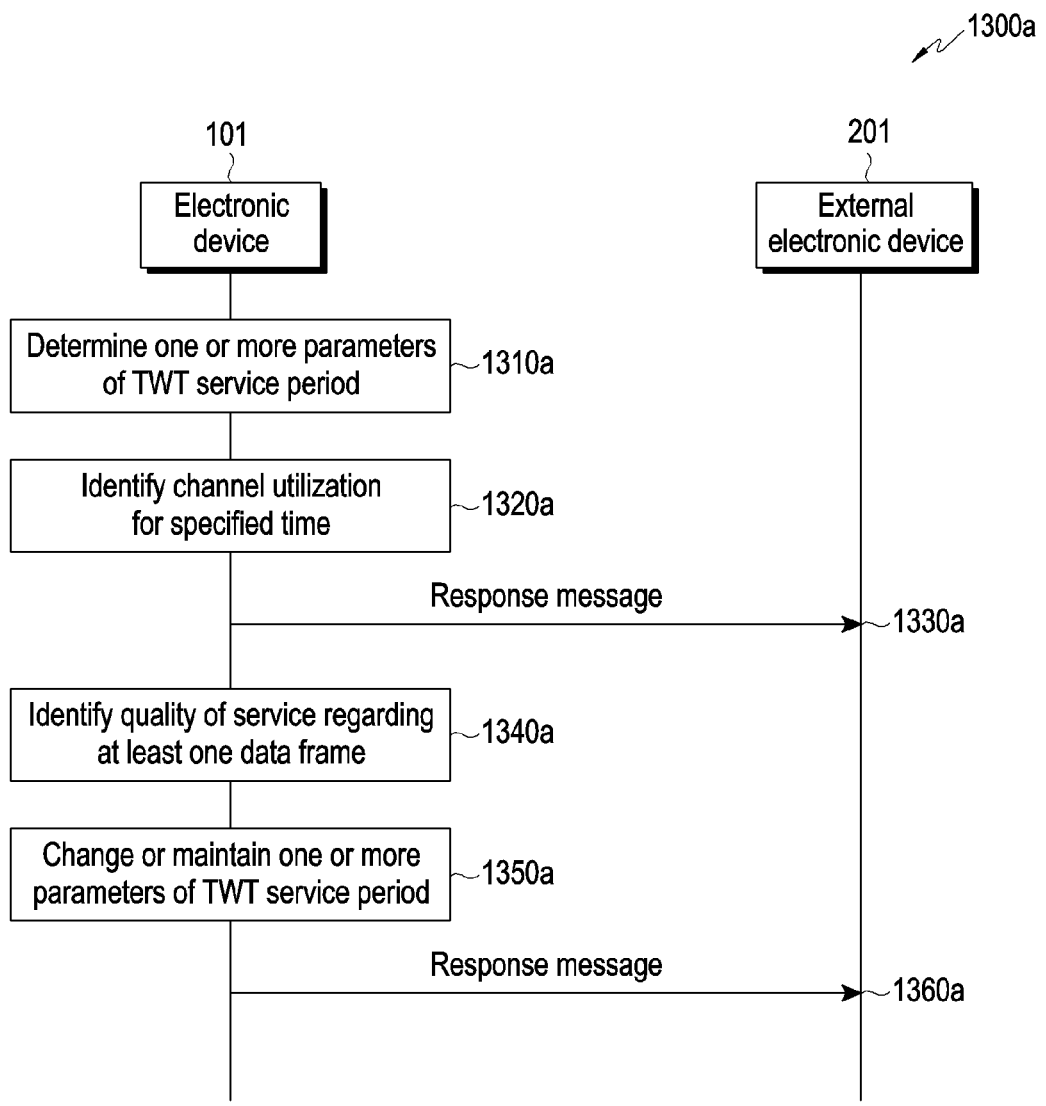
FIG. 13A is a flowchart illustrating a method in which an electronic device resets a TWT service period on the basis of quality of service according to various embodiments.
Figure 13B:
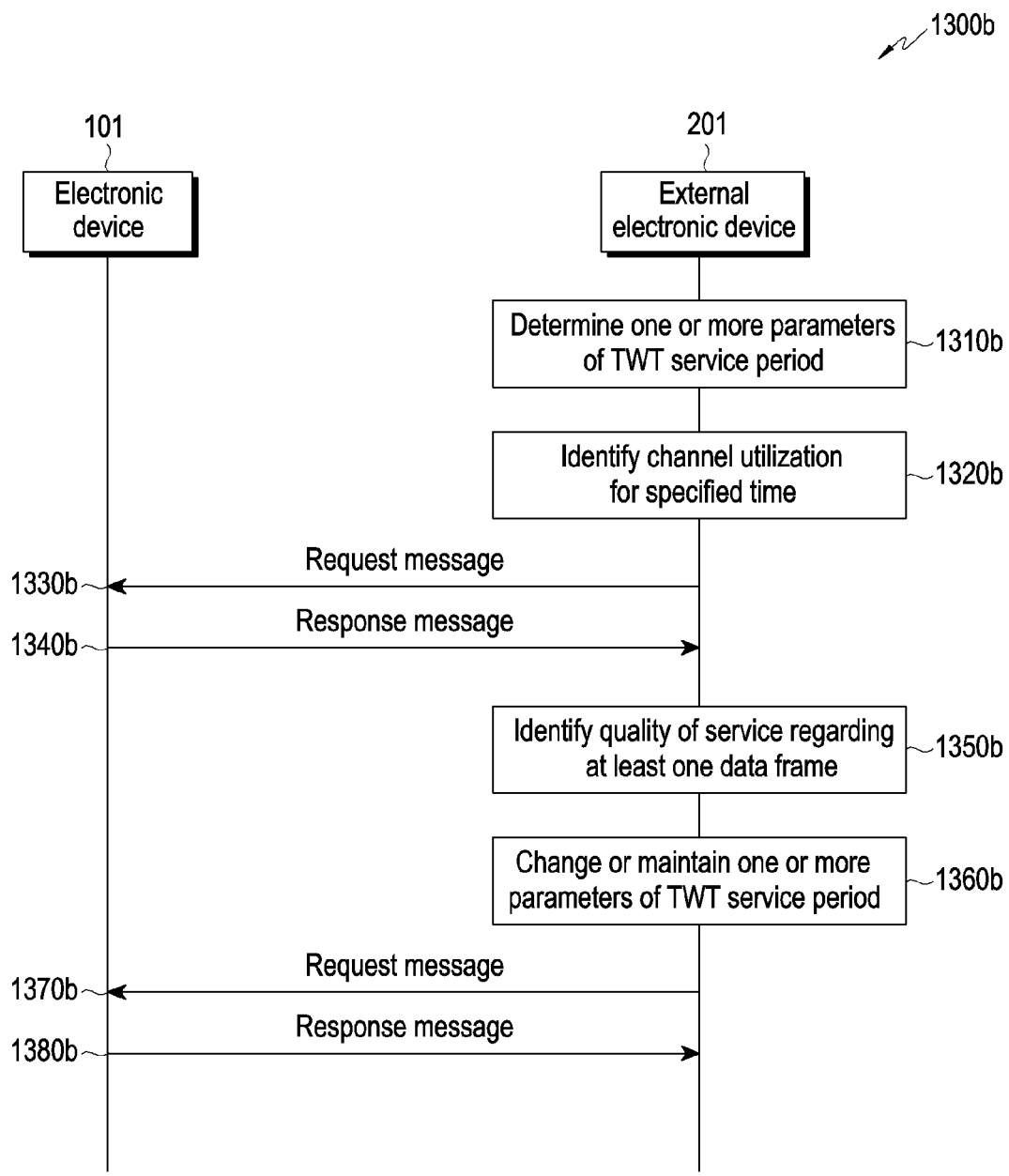
FIG. 13B is a flowchart illustrating a method in which an external electronic device resets a TWT service period on the basis of quality of service according to various embodiments.

FIG. 13A is a flowchart 1300a illustrating a method in which an electronic device 101 resets a TWT service period on the basis of quality of service (QoS) according to various embodiments. FIG. 13B is a flowchart 1300b illustrating a method in which an external electronic device 205 resets a TWT service period on the basis of quality of service according to various embodiments.

Referring to FIG. 13A, according to various embodiments, the electronic device 101 may determine one or more parameters of a TWT service period in operation 1310a.

According to various embodiments, the electronic device 101 may identify channel utilization for a specified time in operation 1320a.

According to various embodiments, if it is identified that the wireless channel is capable of being occupied according to one or more determined parameters on the basis of a result of identifying the channel utilization, the electronic device 101 may transmit, to the external electronic device 205, a response message (e.g., the TWT response frame) including information on the one or more determined parameters in operation 1330a. Accordingly, the TWT service period may be set up between the electronic device 101 and the external electronic device 205.

According to various embodiments, the electronic device 101 may periodically identify parameters related to quality of service (QoS) regarding at least one data frame in operation 1340a. For example, the parameter related to quality of service may include at least one of the end-to-end latency of the application or an error rate of the image frame. Alternatively, the parameter related to quality of service (QoS) may include at least one parameter among a delay, a packet loss, a delay variation, connectivity, a bandwidth or throughput, or reliability or availability. Alternatively, the parameter related to quality of service (QoS) may include at least one parameter among a QoS class-of-identifier (QCI), a guaranteed bit rate (GBR), a maximum bit rate (MBR), or an allocation and retention priority (ARP).

According to various embodiments, the electronic device 101 may identify the end-to-end latency of an application in the application layer for generating the data frame (e.g., image data) transmitted to the external electronic device 205. For example, after the electronic device 101 periodically transmits a specified packet to the external electronic device 205, if a response to the transmitted packet is received from the external electronic device 205, the electronic device 101 may identify the difference between the time of triggering transmission of the specified packet for identifying the end-to-end latency and the time at which a response to the transmitted packet is received using the application, thereby identifying the end-to-end latency of the application. As another example, the electronic device 101 may also identify the end-to-end latency between the electronic device 101 and a server (e.g., the server 108 in FIG. 1), and may determine, as the parameter related to quality of service in operation 1340a, the latency obtained by adding the identified end-to-end latency between the electronic device 101 and the server 108 to the identified end-to-end latency of the application. Alternatively, according to various embodiments, the electronic device 101 may identify the delay or packet loss parameter among the QoS parameters in order to identify the end-to-end latency of the application or the error rate of the image frame. If the delay or packet loss parameter exceeds a predetermined threshold value or is less than the predetermined threshold value (that is, if the parameter does not satisfy the QoS), the electronic device 101 according to various embodiments may determine that end-to-end latency has occurred in the application or that the error rate of the image frame is high.

According to various embodiments, the electronic device 101 may change or maintain one or more parameters of the TWT service period in operation 1350a. For example, the electronic device 101 may change the TWT wake duration and/or the TWT wake interval of the TWT service period on the basis of the periodically identified parameter related to quality of service, which will be described in more detail with reference to the following drawings.

According to various embodiments, the electronic device 101 may transmit a response message (e.g., the TWT response frame) including information on the one or more changed or maintained parameters to the external electronic device 205 in operation 1360a. Accordingly, the TWT service period may be reset between the electronic device 101 and the external electronic device 205.

Referring to FIG. 13B, according to various embodiments, the external electronic device 205 may determine one or more parameters of the TWT service period in operation 1310b.

According to various embodiments, the external electronic device 205 may identify channel utilization for a specified time in operation 1320b.

According to various embodiments, if it is identified that the wireless channel is capable of being occupied according to one or more determined parameters on the basis of the result of identifying the channel utilization, in operation 1330b, the external electronic device 205 may transmit, to the electronic device 101, a request message (e.g., the TWT request frame) including information on the one or more determined parameters.

According to various embodiments, the electronic device 101 may receive the request message (e.g., the TWT request frame) and transmit a response message (e.g., the TWT response frame) to the external electronic device 205 in operation 1340b. According to various embodiments, the electronic device 101 may identify one or more parameters of the TWT service period included in the request message (e.g., the TWT request frame), determine whether or not to approve or reject the same, and transmit a response message (e.g., the TWT response frame) indicating approval or rejection thereof. Accordingly, the TWT service period may be set up between the electronic device 101 and the external electronic device 205.

According to various embodiments, the external electronic device 205 may periodically identify the parameter related to quality of service (QoS) regarding at least one data frame in operation 1350b. According to various embodiments, the electronic device 101 may identify the end-to-end latency of an application in the application layer for generating the data frame (e.g., sensing data) transmitted to the external electronic device 205. For example, if the external electronic device 205 periodically transmits a specified packet to the electronic device 101 and receives a response to the transmitted packet from the electronic device 101, the electronic device 101 may identify the difference between the time of triggering transmission of the specified packet for identifying the end-to-end latency and the time at which a response to the transmitted packet is received, using the application, thereby identifying the end-to-end latency of the application. As another example, the external electronic device 205 may also identify the end-to-end latency between the external electronic device 205 and the server 108, and may determine, as the parameter related to quality of service in operation 1350b, the latency obtained by adding the identified end-to-end latency between the external electronic device 205 and the server 108 to the identified end-to-end latency of the application.

According to various embodiments, the external electronic device 205 may change or maintain one or more parameters of the TWT service period in operation 1360b. For example, the external electronic device 205 may change the TWT wake duration and/or the TWT wake interval of the TWT service period on the basis of the periodically identified parameter related to quality of service, which will be described in more detail with reference to the following drawings.

According to various embodiments, the external electronic device 205 may transmit a request message (e.g., the TWT request frame) including information on the one or more changed or maintained parameters to the electronic device 101 in operation 1370*b*.

According to various embodiments, the electronic device 101 may receive the request message (e.g., the TWT request frame), and transmit a response message (e.g., the TWT response frame) to the external electronic device 205 in operation 1380*b*. According to various embodiments, the electronic device 101 may identify one or more parameters of the TWT service period included in the request message (e.g., the TWT request frame), determine whether or not to approve or reject the same, and transmit a response message (e.g., the TWT response frame) indicating approval or rejection thereof. Accordingly, the TWT service period between the electronic device 101 and the external electronic device 205 may be reset.

Figure 14A:
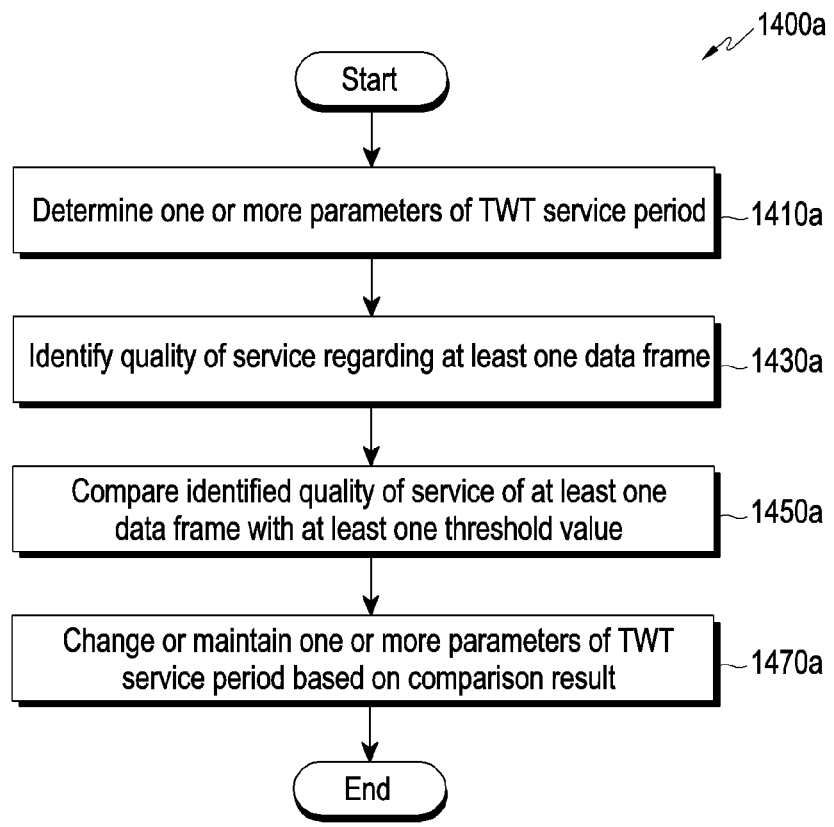
FIG. 14A is a flowchart illustrating a method in which an electronic device or an external electronic device changes a parameter of a TWT service period on the basis of quality of service according to various embodiments.

FIG. 14A is a flowchart 1400*a* illustrating a method in which an electronic device 101 or an external electronic device 205 changes a parameter of a TWT service period on the basis of quality of service according to various embodiments.

According to various embodiments, the electronic device 101 or the external electronic device 205 may determine one or more parameters of a TWT service period in operation 1410*a*.

According to various embodiments, the electronic device 101 or the external electronic device 205 may identify quality of service of at least one data frame in operation 1430*a*.

According to various embodiments, the electronic device 101 or the external electronic device 205 may compare the identified quality of service of at least one data frame with at least one threshold value in operation 1450*a*. For example, the threshold value may be determined on the basis of the end-to-end latency required by the application for generating the data frame transmitted to the counterpart device (hereinafter referred to as "required latency"), and may be determined as a single value or two or more values.

According to various embodiments, the electronic device 101 or the external electronic device 205 may change or maintain one or more parameters of the TWT service period on the basis of the comparison result in operation 1470*a*. For example, if the end-to-end latency identified in FIG. 13A or 13B is equal to or greater than the required latency value by a certain ratio, the electronic device 101 or the external electronic device 205 may reduce the TWT wake interval of the TWT service period or increase the TWT wake duration thereof. If the identified end-to-end latency is less than the required latency value by a certain ratio, the electronic device 101 or the external electronic device 205 may increase the TWT wake interval of the TWT service period or reduce the TWT wake duration thereof. If the identified end-to-end latency is less than the required latency value by a certain ratio, the electronic device 101 or the external electronic device 205 may maintain at least one of the TWT wake interval or the TWT wake duration of the TWT service period.

For example, the electronic device 101 or the external electronic device 205 may change the duration (SP duration) and/or the interval of the TWT service period in stages. For example, the electronic device 101 or the external electronic device 205 may determine a parameter set including the duration and/or interval of the TWT service period on the basis of a refresh rate, periodically identify quality of service, reduce the same by 1 stage whenever quality of service is identified to be good, increase the same by 1 stage whenever quality of service is identified to be bad, and determine the parameters corresponding to the stages as the parameters to be applied to the TWT service period.

Table 1 is an example of a parameter set of the TWT service period when the refresh rate is 60 Hz.

TABLE 1

| Stages | SP durations | Intervals |
| --- | --- | --- |
| 1 | 2 ms | 16.6 ms |
| 2 | 4 ms | 16.6 ms |
| 3 | 6 ms | 16.6 ms |
| 4 | 8 ms | 16.6 ms |
| 5 | 4 ms | 8.3 ms |
| 6 | 6 ms | 8.3 ms |
| 7 | TWT tear down | |

Referring to Table 1, "TWT tear down" in stage 7 may indicate that the scheduling operation according to the TWT service period ends if quality of service continues to be bad, and the electronic device 101 and/or the external electronic device 205 may operate in a normal mode (e.g., state) in stage 7.

Figure 14B:
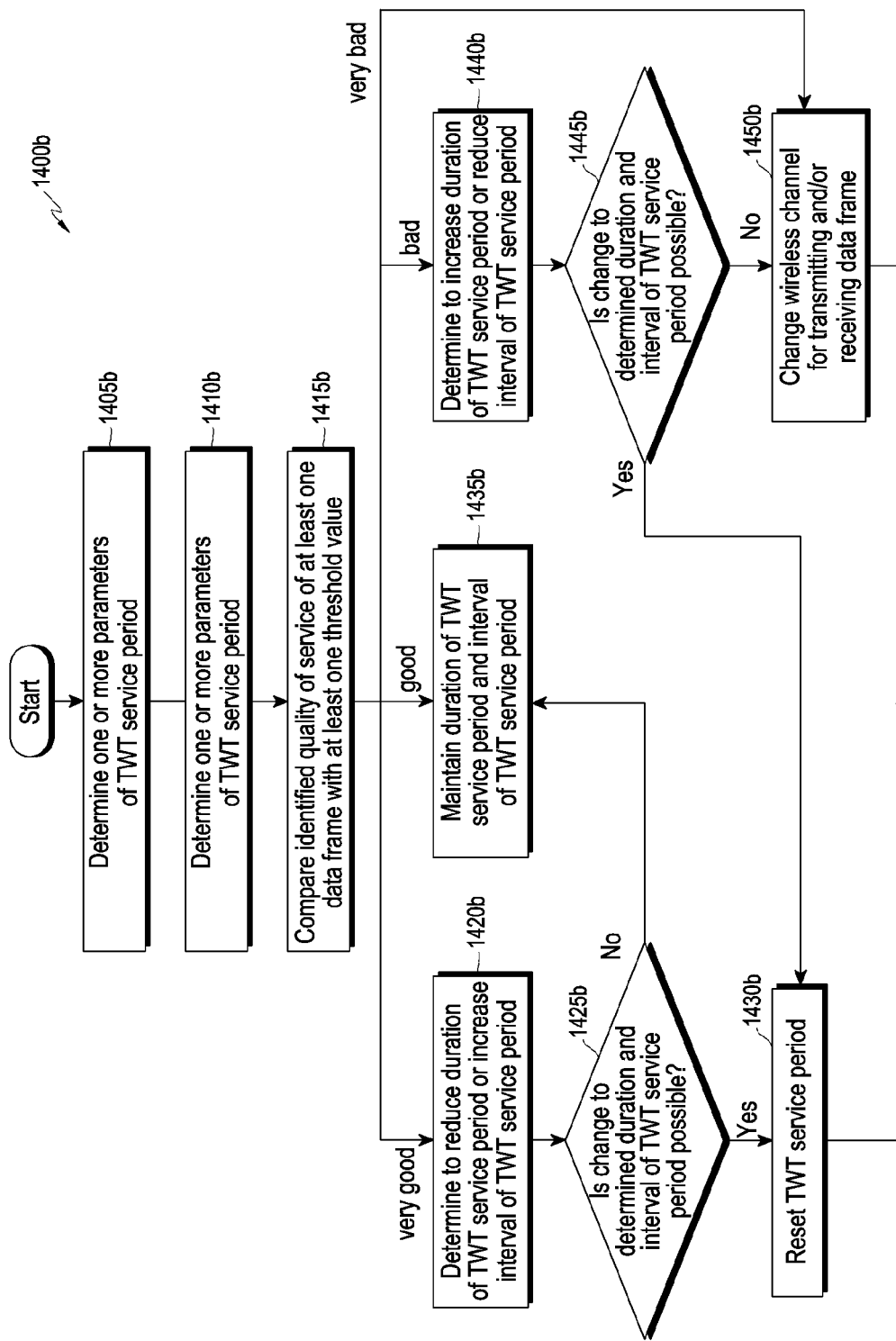
FIG. 14B is a flowchart illustrating a method in which an electronic device or an external electronic device changes a parameter of a TWT service period on the basis of quality of service according to various embodiments.

FIG. 14B is a flowchart 1400*b* illustrating a method in which an electronic device 101 or an external electronic device 205 changes a parameter of a TWT service period on the basis of quality of service according to various embodiments.

According to various embodiments, the electronic device 101 or the external electronic device 205 may determine one or more parameters of a TWT service period in operation 1405*b*.

According to various embodiments, the electronic device 101 or the external electronic device 205 may identify quality of service of at least one data frame in operation 1410*b*.

According to various embodiments, in operation 1415*b*, the electronic device 101 or the external electronic device 205 may compare the identified quality of service for at least one data frame with at least one threshold value. For example, the threshold values may include three threshold values. For example, a first threshold value may be 70% of the required latency value, the second threshold value may be 90% of the required latency value, and the third threshold value may be 150% of the required latency value. For example, if it is identified that the end-to-end latency identified in FIG. 13A or 13B is less than the first threshold value, quality of service (QoS) may be determined to be "very good". For example, if it is identified that the identified end-to-end latency is greater than or equal to the first threshold value and less than the second threshold value, quality of service may be determined to be "good". For example, if it is identified that the identified end-to-end latency is greater than or equal to the second threshold value and less than the third threshold value, quality of service may be determined to be "bad". For example, if it is identified that the identified end-to-end latency is greater than or equal to the third threshold value, quality of service may be determined to be "very bad". The number and ratios of the threshold values are provided by way of example, and are not necessarily limited to the above description.

According to various embodiments, if it is identified that quality of service is "very good" as a result of the comparison, in operation 1420*b*, the electronic device 101 or the external electronic device 205 may reduce the duration (e.g., the TWT wake duration) of the TWT service period or increase the interval (e.g., the TWT wake interval) of the TWT service period.

According to various embodiments, in operation 1425*b*, the electronic device 101 or the external electronic device 205 may identify whether or not a change into the determined duration (e.g., the TWT wake duration) and interval (e.g., the TWT wake interval) of the TWT service period is possible. For example, the electronic device 101 or the external electronic device 205 may identify channel utilization for a specified time and identify whether or not the wireless channel is capable of being occupied according to the determined duration (e.g., the TWT wake duration) or interval (e.g., the TWT wake interval) of the TWT service period. According to various embodiments, if it is identified that a change into the determined duration (e.g., the TWT wake duration) and interval (e.g., the wake interval) of the TWT service period is possible, the electronic device 101 or the external electronic device 205, in operation 1430*b*, may reset the TWT service period on the basis of the determined duration (e.g., the TWT wake duration) and interval (e.g., the TWT wake interval) of the TWT service period. According to various embodiments, if it is identified that a change into the determined duration (e.g., the TWT wake duration) and interval (e.g., the wake interval) of the TWT service period is impossible, the electronic device 101 or the external electronic device 205 may perform operation 1435*b*.

According to various embodiments, if it is identified that quality of service is "good" as a result of the comparison, the electronic device 101 or the external electronic device 205 may maintain the duration of the TWT service period and the interval of the TWT service period in operation 1435*b*.

According to various embodiments, if it is identified that quality of service is "bad" as a result of the comparison, the electronic device 101 or the external electronic device 205 may increase the duration (e.g., the TWT wake duration) of the TWT service period or reduce the interval (e.g., the TWT wake interval) of the TWT service period in operation 1440*b*.

According to various embodiments, in operation 1445*b*, the electronic device 101 or the external electronic device 205 may identify whether or not a change into the determined duration (e.g., the TWT wake duration) and interval (e.g., the TWT wake interval) of the TWT service period is possible. For example, the electronic device 101 or the external electronic device 205 may identify channel utilization for a specified time and identify whether or not the wireless channel is capable of being occupied according to the determined duration (e.g., the TWT wake duration) and interval (e.g., the TWT wake interval) of the TWT service period. According to various embodiments, if it is identified that a change into the determined duration (e.g., the TWT wake duration) and interval (e.g., the TWT wake interval) of the TWT service period is possible, the electronic device 101 or the external electronic device 205 may perform operation 1430*b*. According to various embodiments, if it is identified that a change into the determined duration (e.g., the TWT wake duration) and interval (e.g., the TWT wake interval) of the TWT service period is impossible, the electronic device 101 or the external electronic device 205 may perform operation 1450*b*.

According to various embodiments, if it is identified that quality of service is "very bad" as a result of the comparison, the electronic device 101 or the external electronic device 205 may change the wireless channel for transmitting and/or receiving the data frame in operation 1450*b*.

According to various embodiments, the electronic device 101 or the external electronic device 205 may change the duration (e.g., the TWT wake duration) and/or interval (e.g., the TWT wake interval) of the TWT service period in stages. For example, referring to Table 1, the electronic device 101 or the external electronic device 205 may periodically identify quality of service. If it is identified that quality of service continues to be "very good", the electronic device 101 or the external electronic device 205 may reduce quality of service by 1 stage. If it is identified that quality of service is "good", the electronic device 101 or the external electronic device 205 may maintain the stage. If it is identified that quality of service is "bad", the electronic device 101 or the external electronic device 205 may increase quality of service by 1 stage. If quality of service continues to be "bad" to thus reach stage 7, the electronic device 101 and the external electronic device 205 may terminate the scheduling operation according to the TWT service period and operate in the normal state. If quality of service continues to be "bad" to thus reach stage 7, the electronic device 101 and the external electronic device 205 may change the wireless channel for transmitting and/or receiving the data frame. If it is identified that quality of service is "very bad", the electronic device 101 or the external electronic device 205 may change the wireless channel for transmitting and/or receiving the data frame.

Figure 15:
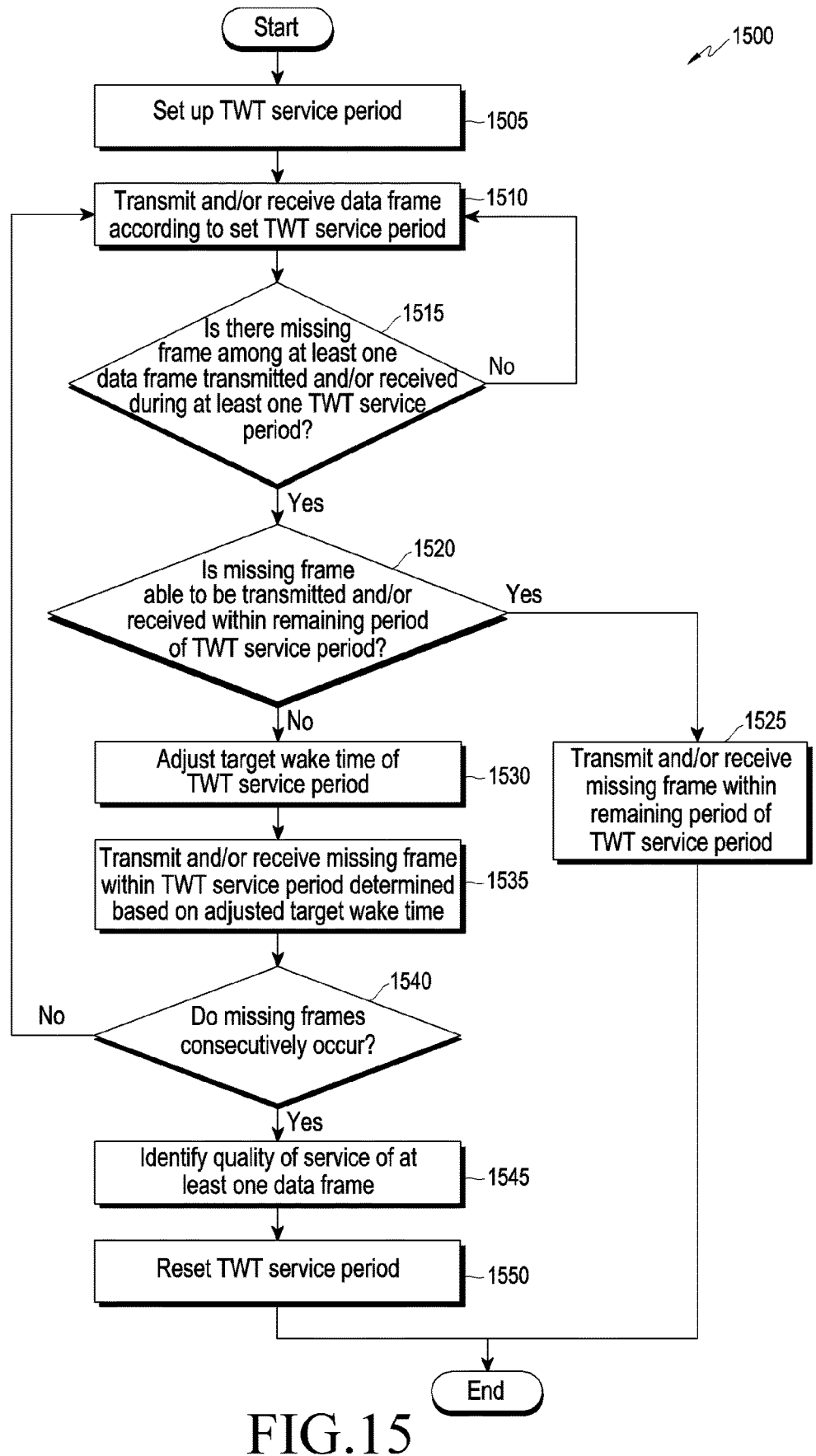
FIG. 15 is a flowchart illustrating a method in which an electronic device and/or an external electronic device control latency due to failure of transmission according to various embodiments.

FIG. 15 is a flowchart 1500 illustrating a method in which an electronic device 101 and/or an external electronic device 205 control latency due to failure of transmission according to various embodiments.

According to various embodiments, the electronic device 101 or the external electronic device 205 may set up a TWT service period in operation 1505.

According to various embodiments, the electronic device 101 or the external electronic device 205 may transmit and/or receive a data frame according to the set TWT service period in operation 1510.

According to various embodiments, in operation 1515, the electronic device 101 or the external electronic device 205 may identify whether or not there is a missing frame among at least one data frame transmitted and/or received during at least one TWT service period. According to various embodiments, if it is identified that there is no missing frame among at least one data frame transmitted and/or received during at least one TWT service period, the electronic device 101 or the external electronic device 205 may reperform operation 1510, thereby transmitting and/or receiving a corresponding next data frame during the next TWT service period.

According to various embodiments, if it is identified that there is a missing frame among at least one data frame transmitted and/or received during at least one TWT service period, the electronic device 101 or the external electronic device 205 may identify whether or not the missing frame is able to be transmitted and/or received within the TWT service period in operation 1520.

According to various embodiments, if it is identified that the missing frame is able to be transmitted and/or received within the TWT service period, the electronic device 101 or the external electronic device 205 may transmit and/or receive the missing frame within the remaining period of the TWT service period in operation 1525.

According to various embodiments, if it is identified that the missing frame is unable to be transmitted and/or received within the TWT service period, the electronic device 101 or the external electronic device 205 may adjust the target wake time of the TWT service period in operation 1530.

According to various embodiments, in operation 1535, the electronic device 101 or the external electronic device 205 may transmit and/or receive the missing frame within a TWT service period (e.g., the added service period) determined based on the adjusted target wake time.

According to various embodiments, in operation 1540, the electronic device 101 or the external electronic device 205 may identify whether or not the missing frames consecutively occur. According to various embodiments, if it is identified that the missing frames do not occur consecutively, the electronic device 101 or the external electronic device 205 may perform reoperation 1510 and transmit and/or receive a corresponding next data frame during the next TWT service period.

According to various embodiments, if it is identified that missing frames consecutively occur, the electronic device 101 or the external electronic device 205 may identify quality of service of at least one data frame in operation 1545. The electronic device 101 or the external electronic device 205 may periodically identify quality of service, thereby identifying the parameters related to quality of service regarding at least one data frame. The electronic device 101 or the external electronic device 205 may determine the TWT wake duration and/or the TWT wake interval of the TWT service period to be changed based on the parameters related to quality of service.

According to various embodiments, the electronic device 101 or the external electronic device 205 may reset the TWT service period in operation 1550. The electronic device 101 or the external electronic device 205 may reset the TWT service period between the electronic device 101 and the external electronic device 205 on the basis of the TWT wake duration and/or the TWT wake interval of the determined TWT service period.

According to various embodiments, an electronic device may include a communication circuit operably coupled with an external electronic device and at least one processor, wherein the at least one processor may be configured to: determine one or more target-wake-time (TWT) parameters of at least one TWT service period based on at least one of the amount of data transmitted to the external electronic device, an amount of data received from the external electronic device, or a bandwidth, wherein at least one data frame is transmitted or received between the electronic device and the external electronic device during the at least one TWT service period; identify quality of service (QoS) for the at least one data frame transmitted or received during the at least one TWT service period; change at least one TWT parameter among the one or more TWT parameters based on the identified QoS; and control the communication circuit to transmit or receive at least one next data frame during a next TWT service period based on the changed at least one TWT parameter.

According to various embodiments, the at least one processor may be configured to identify the end-to-end latency of the at least one data frame and identify the QoS for the at least one data frame based on the identified end-to-end latency of the at least one data frame.

According to various embodiments, the QoS may include the end-to-end latency of the at least one data frame, and the at least one processor may be further configured to compare the end-to-end latency of the at least one data frame with at least one threshold value and determine at least one TWT parameter for the next TWT service period based on the identified comparison result of the identified end-to-end latency of the at least one data frame and the at least one threshold value.

According to various embodiments, the at least one threshold value may be determined based on a required end-to-end latency for an application that generates at least a portion of the at least one data frame.

According to various embodiments, the at least one processor may be further configured to determine at least one TWT parameter for the next TWT service period and based on determining the at least one TWT parameter for the next TWT service period, control the communication circuit to transmit a TWT response frame to the external electronic device, and the TWT response frame may include information about the changed at least one TWT parameter.

According to various embodiments, the at least one TWT parameter may include at least one of a TWT wake duration and a TWT wake interval of a TWT service period.

According to various embodiments, the QoS may include end-to-end latency of the at least one data frame, and the at least one processor may be further configured to, in response to determining that the end-to-end latency of the at least one data frame is less than a first threshold value, reduce a TWT wake duration of the next TWT service period, or increase a TWT wake interval of the next TWT service period.

According to various embodiments, the QoS may include the end-to-end latency of the at least one data frame, and the at least one processor may be further configured to, in response to determining that the end-to-end latency of the at least one data frame is greater than a second threshold value, increase the duration of the next TWT service period or reduce the interval of the next TWT service period.

According to various embodiments, the QoS may include the end-to-end latency of the at least one data frame, and the at least one processor may be further configured to change a channel for transmitting or receiving the at least one next data frame in response to identifying that the end-to-end latency of the at least one data frame is greater than a third threshold value.

According to various embodiments, the at least one processor may be further configured to identify channel utilization of a channel through which the at least one data frame is transmitted or received, identify whether the at least one next data frame is able to be transmitted or received according to the changed at least one TWT parameter based on the identified channel utilization, and change a channel for transmitting and/or receiving the at least one next data frame in response to identifying that the at least one next data frame is unable to be transmitted or received according to the changed at least one TWT parameter.

According to various embodiments, the at least one processor may be further configured to, in response to identifying that the at least one next data frame is unable to be transmitted or received according to the changed at least one TWT parameter, control the communication circuit to transmit, to the external electronic device, information on the channel to be changed through at least one of a communication scheme or a channel that is different from how the at least one data frame is transmitted or received.

According to various embodiments, the at least one processor may be further configured to identify whether a missing frame exists during a first TWT service period among the at least one TWT service period, and, in response to identifying that the missing frame exists during the first TWT service period, control the communication circuit to transmit and/or receive the missing frame to or from the external electronic device during the first TWT service period or a second TWT service period different from the at least one TWT service period, and the second TWT service period may be determined to be a period added prior to the starting time of the next TWT service period of the first TWT service period among the at least one TWT service period based on TWT information transmitted during the first TWT service period among the at least one TWT service period.

According to various embodiments, the at least one processor may be further configured to control the communication circuit to transmit a first data frame during the first TWT service period, and, after transmitting the first data frame, in response to a response message not being received from the external electronic device or in response to identifying from the response message received from the external electronic device, that at least a portion of the first data frame is not received by the external electronic device, determine that the missing frame exists.

According to various embodiments, the at least one processor may be further configured to identify whether the missing frame is able to be transmitted to the external electronic device within the first TWT service period, and, in response to identifying that the missing frame is unable to be transmitted to the external electronic device within the first TWT service period, control the communication circuit to transmit a TWT information frame including the TWT information to the external electronic device in the next TWT service period.

According to various embodiments, the TWT information may include information indicating the starting time of the second TWT service period.

According to various embodiments, a method for controlling an electronic device may include: determining one or more TWT parameters of at least one TWT service period based on at least one of the amount of data transmitted to an external electronic device connected to the electronic device, an amount of data received from the external electronic device connected to the electronic device, or a bandwidth, wherein at least one data frame is transmitted or received between the electronic device and the external electronic device during the at least one TWT service period; identifying a quality of service (QoS) for the at least one data frame transmitted and/or received during the at least one TWT service period; changing at least one TWT parameter among the one or more TWT parameters on the basis of the identified QoS; and transmitting or receiving at least one next data frame during the next TWT service period based on the changed at least one TWT parameter.

According to various embodiments, an electronic device may include a communication circuit and at least one processor, wherein the at least one processor may be configured to: determine one or more periods for transmitting and/or receiving data frames between the electronic device and an external electronic device based on at least one of the amount of data transmitted to and received from an external electronic device, which is operably connected through the communication circuit, or a bandwidth; identify whether a missing frame exists among one or more data frames transmitted and/or received during a first period of the determined one or more periods; and, in response to identifying the missing frame exists, control the communication circuit to transmit and/or receive the missing frame to and/or from the external electronic device during a second period, which is different from the determined periods, and wherein the second period may be determined to be a period prior to a starting time of the next period of the first period, among the one or more determined periods, based on information transmitted during the first period.

According to various embodiments, the at least one processor may be further configured to control the communication circuit to transmit a first data frame during the first period, and, after transmitting the first data frame, in response to identifying a response message is not received from the external electronic device or in response to identifying, from the response message received from the external electronic device, that at least a portion of the first data frame has not been received by the external electronic device, to determine that there is a missing frame.

According to various embodiments, the at least one processor may be further configured to identify whether the missing frame is able to be transmitted to the external electronic device within the first TWT service period, and, in response to identifying that the missing frame is unable to be transmitted to the external electronic device within the first TWT service period, control the communication circuit to transmit a TWT information frame including information for configuring a second period to the external electronic device in the next TWT service period.

According to various embodiments, the information for configuring the second period may include information indicating the starting time of the second period.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising: a communication circuit operably coupled with an external electronic device; and at least one processor, wherein the at least one processor is configured to: determine one or more target-wake-time (TWT) parameters of at least one TWT service period based on at least one of an amount of data transmitted to the external electronic device, an amount of data received from the external electronic device, or a bandwidth, wherein at least one data frame is transmitted or received between the electronic device and the external electronic device during the at least one TWT service period, identify a quality of service (QoS) for the at least one data frame transmitted or received during the at least one TWT service period, wherein the QoS includes an end-to-end latency of the at least one data frame, change at least one TWT parameter among the one or more TWT parameters based on the identified QoS, and control the communication circuit to transmit or receive at least one next data frame during a next TWT service period based on the changed at least one TWT parameter, and wherein to change the at least one TWT parameter, the at least one processor is further configured to: compare the end-to-end latency of the at least one data frame with a first threshold value, wherein the first threshold value is based on the end-to-end latency, and in response to determining that the end-to-end latency of the at least one data frame is less than the first threshold value, reduce a TWT wake duration of the next TWT service period or increase a TWT wake interval of the next TWT service period.

2. The electronic device of claim 1, wherein the at least one processor is configured to:
   identify an end-to-end latency of the at least one data frame, and
   identify the QoS for the at least one data frame based on the identified end-to-end latency of the at least one data frame.

3. The electronic device of claim 1, wherein:
   the at least one processor is further configured to:
      determine at least one TWT parameter for the next TWT service period, and
      based on determining the at least one TWT parameter for the next TWT service period, control the communication circuit to transmit a TWT response frame to the external electronic device, and
   the TWT response frame includes information about the changed at least one TWT parameter.

4. The electronic device of claim 1, wherein the at least one TWT parameter includes at least one of a TWT wake duration or a TWT wake interval of a TWT service period.

5. The electronic device of claim 1, wherein the at least one processor is further configured to:
   in response to determining that the end-to-end latency of the at least one data frame is greater than a second threshold value, increase a duration of the next TWT service period or reduce an interval of the next TWT service period.

6. The electronic device of claim 1, wherein the at least one processor is further configured to:
   change a channel for transmitting or receiving the at least one next data frame in response to determining that the end-to-end latency of the at least one data frame is greater than a third threshold value.

7. The electronic device of claim 1, wherein the at least one processor is further configured to:
   identify a channel utilization of a channel through which the at least one data frame is transmitted or received,
   identify whether the at least one next data frame is able to be transmitted or received according to the changed at least one TWT parameter based on the identified channel utilization, and change a channel for transmitting or receiving the at least one next data frame in response to identifying that the at least one next data frame is unable to be transmitted or received according to the changed at least one TWT parameter.

8. The electronic device of claim 7, wherein the at least one processor is further configured to:
in response to identifying that the at least one next data frame is unable to be transmitted or received according to the changed at least one TWT parameter, control the communication circuit to transmit, to the external electronic device, information on the channel to be changed through at least one of a communication scheme or a channel different from how the at least one data frame is transmitted or received.

9. The electronic device of claim 1, wherein:
the at least one processor is further configured to:
identify whether a missing frame exists during a first TWT service period among the at least one TWT service period, and
in response to identifying that the missing frame exists during the first TWT service period, control the communication circuit to transmit or receive the missing frame to or from the external electronic device during the first TWT service period or a second TWT service period different from the at least one TWT service periods, and
the second TWT service period is determined as a period added prior to a starting time of the next TWT service period of the first TWT service period among the at least one TWT service period based on TWT information transmitted during the first TWT service period among the at least one TWT service period.

10. The electronic device of claim 9, wherein the at least one processor is further configured to:
control the communication circuit to transmit a first data frame during the first TWT service period, and
after transmitting the first data frame, in response to a response message not being received from the external electronic device or in response to identifying, from the response message received from the external electronic device, that at least a portion of the first data frame is not received by the external electronic device, determine that the missing frame exists.

11. The electronic device of claim 9, wherein the at least one processor is further configured to:
identify whether the missing frame is able to be transmitted to the external electronic device within the first TWT service period, and
in response to identifying that the missing frame is unable to be transmitted to the external electronic device within the first TWT service period, control the communication circuit to transmit a TWT information frame including the TWT information to the external electronic device in the next TWT service period.

12. The electronic device of claim 1, wherein the at least one processor is further configured to: determine at least one TWT parameter for the next TWT service period based on the identified comparison result of the end-to-end latency of the at least one data frame and the at least one threshold value.

13. A method for controlling an electronic device, the method comprising: determining one or more TWT parameters of at least one TWT service period based on at least one of an amount of data transmitted to an external electronic device connected to the electronic device, an amount of data received from the external electronic device, or a bandwidth, wherein at least one data frame is transmitted or received between the electronic device and the external electronic device during the at least one TWT service period; identifying a quality of service (QoS) for the at least one data frame transmitted or received during the at least one TWT service period, wherein the QoS includes an end-to-end latency of the at least one data frame; changing at least one TWT parameter among the one or more TWT parameters based on the identified QoS; and transmitting or receiving at least one next data frame during next TWT service period based on the changed at least one TWT parameter, wherein changing the at least one TWT parameter comprises: comparing the end-to-end latency of the at least one data frame with a first threshold value, wherein the first threshold value is based on the end-to-end latency, and in response to determining that the end-to-end latency of the at least one data frame is less than the first threshold value, reducing a TWT wake duration of the next TWT service period or increase a TWT wake interval of the next TWT service period.

* * * * *